US012597871B2

(12) United States Patent
Eckerle et al.

(10) Patent No.: US 12,597,871 B2
(45) Date of Patent: Apr. 7, 2026

(54) SYSTEM AND METHOD FOR PROVIDING N BIPOLAR AC PHASE VOLTAGES

(71) Applicant: Universitaet der Bundeswehr Muenchen, Neubiberg (DE)

(72) Inventors: Richard Eckerle, Munich (DE); Manuel Kuder, Munich (DE); Julian Schneider, Munich (DE); Thomas Weyh, Munich (DE)

(73) Assignee: Universitaet der Bundeswehr Muenchen, Neubiberg (DE)

( * ) Notice: Subject to any disclaimer, the term of this patent is extended or adjusted under 35 U.S.C. 154(b) by 585 days.

(21) Appl. No.: 17/794,406

(22) PCT Filed: Nov. 27, 2020

(86) PCT No.: PCT/EP2020/083584
§ 371 (c)(1),
(2) Date: Jul. 21, 2022

(87) PCT Pub. No.: WO2021/151554
PCT Pub. Date: Aug. 5, 2021

(65) Prior Publication Data
US 2023/0060698 A1      Mar. 2, 2023

(30) Foreign Application Priority Data

Jan. 31, 2020      (EP) ..................................... 20154939

(51) Int. Cl.
*H02M 7/12*        (2006.01)
*B60L 3/00*        (2019.01)
(Continued)

(52) U.S. Cl.
CPC ........... *H02M 7/797* (2013.01); *B60L 3/0046* (2013.01); *B60L 58/19* (2019.02); *H02M 1/0067* (2021.05); *H02P 23/00* (2013.01)

(58) Field of Classification Search
CPC .. H02P 6/182; H02P 9/30; H02P 9/307; H02P 21/00; H02P 21/0021; H02P 21/04;
(Continued)

(56) References Cited

U.S. PATENT DOCUMENTS

| | | | | |
|---|---|---|---|---|
| 2012/0113699 A1* | 5/2012 | Crookes | ................ | H02M 7/483 |
| | | | | 363/126 |
| 2015/0207434 A1* | 7/2015 | Wang | .................. | H02M 7/4835 |
| | | | | 363/78 |

(Continued)

FOREIGN PATENT DOCUMENTS

| | | |
|---|---|---|
| DE | 102014110410 A1 | 1/2016 |
| DE | 202017102722 U1 | 6/2017 |

(Continued)

OTHER PUBLICATIONS

International Search Report & Written Opinion of the International Searching Authority dated Feb. 17, 2021 for International Application No. PCT/EP2020/083584.

(Continued)

*Primary Examiner* — Eduardo Colon Santana
*Assistant Examiner* — Charles S Laughlin
(74) *Attorney, Agent, or Firm* — Eschweiler & Potashnik, LLC

(57)      ABSTRACT

Disclosed herein is a system (20) for providing N bipolar AC phase voltages $U_{Vj}$, with j=1 . . . N, said system (20) comprising N modular energy storage direct converter systems (MESDCS) (22) and a control system (20), wherein the first ends (24) of each MESDCS (22) are connected to a common floating connection point (28), and wherein the j-th MESDCS (22) is controllable to output at its second end (26) a star voltage $U_{Sj}$ with respect to the floating connection point (28), with j=1, . . . , N, wherein said system (20) is configured to provide each of said phase voltages $U_{Vj}$ as (Continued)

voltage differences between two of said star voltages, such that $U_{Vj}=U_{Sj+1}-U_{Sj}$, or $U_{Vj}=U_{Sj}-U_{Sj+1}$, for each j between 1 and N-1, and $U_{VN}=U_{S1}-U_{SN}$, or $U_{VN}=U_{SN}-U_{S1}$, respectively, wherein said control system (30) is configured to control each MESDCS (22) to output a corresponding unipolar star voltage Us, that can be decomposed into a periodic bipolar AC function $P_j(t)$ and a unipolar offset $U_{off}(t)$ that is common to each star voltage $U_{Sj}$, such that $U_{Sj}(t)=P_j(t)+U_{off}(t)$, wherein the absolute value of said common unipolar offset $U_{off}(t)$ is at all times t sufficiently high that $U_{Sj}(t)$ is unipolar, wherein the periodic bipolar AC functions $P_j(t)$ associated with different star voltages $U_{Sj}$ are phase-shifted copies of each other such that for each integers i, j chosen from [1, . . . , N] and k chosen from [1, . . . , N-1], $P_i(t)=P_j(t+k\cdot T/N)$, wherein T is the period of said periodic bipolar AC function $P_j(t)$, wherein in particular, $P_i(t)=P_j(t+(i-j)\cdot T/N)$.

20 Claims, 11 Drawing Sheets

(51) Int. Cl.

| | |
|---|---|
| *B60L 58/19* | (2019.01) |
| *H02M 1/00* | (2006.01) |
| *H02M 7/797* | (2006.01) |
| *H02P 23/00* | (2016.01) |

(58) Field of Classification Search
CPC .......... H02P 21/09; H02P 21/20; H02P 21/32; H02P 2101/25; H02P 2101/30; H02P 2203/11; H02P 23/14; H02P 23/22; H02P 25/024; H02P 27/085; H02P 29/024; H02P 29/0241; H02P 29/50; H02P 3/18; H02P 5/60; H02P 6/007; H02P 6/18; H02P 6/183; H02P 6/185; H02P 7/281; H02P 9/00; H02P 9/04; H02P 9/10; H02P 1/46; H02P 2101/15
See application file for complete search history.

(56) References Cited

U.S. PATENT DOCUMENTS

| | | | |
|---|---|---|---|
| 2017/0207631 A1* | 7/2017 | Helling | H02M 7/4837 |
| 2019/0115849 A1* | 4/2019 | Götz | H02P 25/22 |
| 2021/0111642 A1 | 4/2021 | Weyh et al. | |

FOREIGN PATENT DOCUMENTS

| | | |
|---|---|---|
| DE | 102018109926 A1 | 10/2019 |
| WO | 2010149200 A1 | 12/2010 |

OTHER PUBLICATIONS

Kloeffer, Christian "Range Extension of Electric Vehicles Through Optimization of the Electric Powertrain" Electrical Engineering and Information Technology of the Karlsruhe Institute of Technology (KIT), Jul. 30, 2015.

* cited by examiner

SYSTEM AND METHOD FOR PROVIDING N BIPOLAR AC PHASE VOLTAGES

REFERENCE TO RELATED APPLICATIONS

This Application is a National Phase entry of International Application number PCT/EP2020/083584, filed on Nov. 27, 2020, which claims the benefit of European Application number 20154939.1, filed on Jan. 31, 2020. The contents of the above-referenced Patent Applications are hereby incorporated by reference in their entirety.

FIELD OF THE INVENTION

The present invention is in the field of power supplies for electrical devices such as electrical motors. More particularly, the present invention relates to a system and method for providing N bipolar AC—phase voltages based on modular energy storage direct converter systems.

BACKGROUND OF THE INVENTION

Battery-powered systems have increased in importance in various fields of technology, including electric mobility, where battery systems form a key component for the mobility of the future. In order to make use of the energy stored in a battery system, an additional power electric converter is usually needed, which may serve for stabilizing the output voltage or for generating a desired phase of an alternating voltage.

In DE 10 2014 110 410 A1, a modular energy storage direct converter system (MESDCS) was proposed which combines the storage capacity of batteries with the topology of a multilevel converter. The MESDCS comprises one or more converter arms each comprising a plurality of cascaded modules, wherein each module comprises an energy storage element, such as a battery, and a plurality of module switches allowing for selectively connecting energy storage elements of adjacent modules in series, and depending on the specific design, further allowing to connect energy storage elements of adjacent modules in one or more of anti-series, in parallel or in a "deactivated state" where the energy storage element is bypassed in the series connection. The generic term "modular energy storage direct converter system" used herein derives from the fact that it is "modular" by being built up of modules, is capable of storing energy by means of energy storage elements provided in said modules, and is a "direct converter system" in as much as it is designed to actuate the module switches in such way that the converter arm as a whole already supplies a desired output voltage, such that no additional converter is needed. Indeed, the MESDCS can generally provide arbitrary DC output voltages or AC output voltage waveforms by means of actuating at least a part of said plurality of module switches.

It is worth noting that the same flexibility as with regard to the output voltages exists for the charging of the energy storage elements, which can be charged with practically any voltage applied across the converter arm, including both DC and AC voltages.

The MESDCS as disclosed in the above-referenced DE 10 2014 110 410 A1 has a number of important advantages. For example, since the voltages associated with each individual energy storage element/energy conversion element can be comparatively low, the module switches do not have to switch high voltages. This for example allows for using standard low-voltage silicon MOSFETs instead of more expensive and lossy IGBTs or silicon carbide-MOSFETs. Moreover, switching of lower voltages by the module switches allows for a better electromagnetic compatibility and reduced total harmonic distortion.

DE 10 2014 110 410 A1 also shows how a MESDCS can be used for three-phase electric power systems. For coupling the MESDCS with a three-phase current load, the converter arms are connected either in star topology or ring topology. Since the batteries that may be used in the modules as energy storage elements may have an appreciable internal resistance, this document proposes to switch modules in parallel if smaller overall output voltages are needed, to thereby decrease the total resistance of the converter arm. Note that wherever reference is made herein to switching "modules in parallel/in series" this is to be understood as a short way of saying that the energy storage elements of the modules are switched in parallel/in series.

FIG. 1 shows an individual module 10 corresponding to the module shown in FIG. 7 of DE 10 2014 110 410 A1 which comprises two first terminals 12, two second terminals 14, an energy storage element 16 and a total of eight switches 18, arranged in two have bridges on both sides of the energy storage element 16. The module allows for selectively switching the energy storage elements 16 of adjacent modules 10 selectively in series, in anti-series (i.e. with reversed polarity), in parallel, and to selectively "deactivate" the energy storage element 16 by bypassing it in a series connection of the energy storage elements 16 of the adjacent modules on both sides. FIG. 2 shows a further module 10 having a ninth switch 18 directly adjacent to the energy storage element 16, which allows to switch modules in parallel which are separated by an arbitrary number of deactivated modules (modules with bypassed energy storage elements) of the same type. The modules 10 FIGS. 1 and 2 are so called four-quadrant modules, since they can operate in all four quadrants of the voltage-current plane. However, the flexibility of the modules of FIGS. 1 and 2 comes at the price of a large number of module switches 18 and corresponding switching effort.

FIG. 3 shows two alternative modules 10, likewise comprising two first terminals 12, two second terminals 14, an energy storage element 16, but only three (left module) and four (right module) semiconductor switches, respectively. FIG. 4 shows four three-switch modules 10 (upper part of figure) and four four-switch modules 10 (lower part of figure) connected one behind the other such as to form part of a converter arm. The three-switch module 10 shown on the left of FIG. 3 allows for connecting the energy storage elements 16 of adjacent modules selectively in series and in parallel, and to bypass it in a series connection. However, it does not permit connecting adjacent modules in anti-series, i.e. changing the polarity of the energy storage element 16 in the series connection, nor does it allow to bypass the energy storage element 16 in a parallel connection of its adjacent modules, which however is possible with the four-switch module shown on the right of FIG. 3.

Since the modules 10 shown in FIG. 4 cannot change their polarity in the series connection, the series connection of modules as a whole (and a converter arm formed by such cascaded modules 10) can only provide voltages of one polarity, which is referred to as "unipolar output voltage" herein. In order to use these modules in an MESDCS that provides bipolar AC voltages, DE 10 2014 110 410 A1 suggests to provide an additional polarity reversing circuit (not shown) comprising four additional switches and allowing for changing the polarity of the entire converter arm composed of said three- or four-switch modules.

SUMMARY OF THE INVENTION

According to a first aspect of the invention, a system for providing N bipolar AC phase voltages $U_{Vj}$, with $j=1 \ldots N$, is provided, said system comprising: N modular energy storage direct converter systems (MESDCS) and a control system, wherein each MESDCS comprises a converter arm having a first end and a second end and comprising a plurality of sequentially interconnected modules, wherein each module comprises at least one first terminal and at least one second terminal, a storage element for electrical energy, in particular a battery, or an energy conversion element, and a plurality of module switches. In each two adjacent modules, the at least one first terminal of one module is connected either directly or via an intermediate component to the at least one second terminal of the other module. Under control of said control system, said plurality of module switches allow for connecting energy storage elements or energy conversion elements of adjacent modules in series, and for selectively deactivating or bypassing the energy storage element or energy conversion element of each module and/or for connecting energy storage elements or energy conversion elements of adjacent modules in parallel.

The first ends of each MESDCS are connected to a common floating connection point, and the j-th MESDCS is controllable, by said control system, to output a star voltage $U_{Sj}$ at its second end with respect to the floating connection point, with $j=1, \ldots, N$.

Moreover, said system is configured to provide each of said phase voltages as phase-to-phase voltages $U_{Vj}$, which are formed by voltage differences between two of said star voltages $U_{Sj}$, such that $U_{Vj}=U_{Sj+1}-U_{Sj}$, or $U_{Vj}=U_{Sj}-U_{Sj+1}$ for each j between 1 and N–1, and $U_{VN}=U_{S1}-U_{SN}$, or $U_{VN}=U_{SN}-U_{S1}$, respectively.

That is to say, for each j between 1 and N–1, $U_{Vj}$ may be defined as $U_{Sj+1}-U_{Sj}$ (and $U_{VN}=U_{S1}-U_{SN}$), or may be alternatively defined with reversed polarity convention, i.e. $U_{Vj}=U_{Sj}-U_{Sj+1}$ (and $U_{VN}=U_{SN}-U_{S1}$), but any of the two conventions is applied consistently for all j.

In addition, said control system is configured to control each MESDCS to output a corresponding unipolar star voltage $U_{Sj}$ that can be decomposed into a periodic bipolar AC function $P_j(t)$ and a unipolar offset $U_{off}(t)$ that is common to each star voltage $U_{Sj}$, such that $U_{Sj}=P_j(t)+U_{off}(t)$, wherein the absolute value of said common unipolar offset $U_{off}(t)$ is at all times t sufficiently high that $U_{Sj}(t)$ is unipolar. Herein, the periodic bipolar AC functions $P_j(t)$ associated with different star voltages $U_{Sj}$ are phase-shifted copies of each other such that for each integers i, j chosen from $[1, \ldots, N]$ and k chosen from $[1, \ldots, N-1]$, $P_i(t)=P_j(t+k \cdot T/N)$, wherein T is the period of said periodic bipolar AC function $P_j(t)$.

In particularly preferred embodiments, $P_i(t)=P_j(t+(i-j) \cdot T/N)$.

According to the first aspect of the invention, bipolar AC phase-to-phase voltages $U_{Vj}$ can be generated from voltage differences between star voltages $U_{Sj+1}$, $U_{Sj}$, which themselves can be unipolar, due to a common offset $U_{off}(t)$ of all star voltages $U_{Sj}$. Since the phase-to-phase voltages $U_{Vj}$ are formed by star voltage differences, the common offset $U_{off}(t)$ has no effect on the phase-to-phase voltages $U_{Vj}$. Instead, the phase-to-phase voltages $U_{Vj}$ are only governed by the contribution of the periodic bipolar AC functions $P_j(t)$ to each corresponding star voltage $U_{Sj}$, which may in principle be arbitrarily chosen, provided that they exhibit the above-mentioned periodicity and phase shift.

It follows that the aforementioned "phase voltages" can be generated as "bipolar phase-to phase voltages" using MESDCS which themselves do not have to be devised for bipolar voltage generation. Accordingly, it is not necessary to employ modules having eight or even nine module switches 18 as shown in FIG. 1 or 2 that would allow for connection in "anti-series" i.e. the change of polarity of each individual module 10. Instead, it becomes possible to rely on two-quadrant modules of the type shown in FIGS. 3 and 4, which require three and four switches 18, respectively, only, thereby allowing to significantly reduce the number of switches 18 and switching effort. This is a different approach for employing two-quadrant modules for outputting bipolar voltages than the one suggested DE 10 2014110 410 A1, where an additional polarity reversing circuit comprising four additional switches was used for changing the polarity of the entire converter arm composed of said three- or four-switch modules. While the number of switches in the two-quadrant modules is smaller than in a four-quadrant module, it is to be kept in mind that the four-quadrant modules allow for generating voltages of both polarities, such that a smaller number of four-quadrant modules is generally needed to cover the same overall voltage range.

The inventors have noticed that with the system according to this aspect of the invention, a significant increase in efficiency can be obtained as compared to an MESDCS having two-quadrant-modules and an additional polarity reversing circuit. Namely, while the module switches 18 are only devised for comparatively low battery voltages and therefore allow for using MOSFETs with low resistance, the switches provided in the polarity reversing circuit have to be devised for much higher voltages, which typically calls for IGBT transistors having not only a higher cost, but also higher conductance losses. By dispensing with these high voltage switches, the energy efficiency of the system as a whole can be significantly increased.

While in the specific embodiments described herein, each of the modules comprise a battery, it is noted that the invention is not limited to this, as the invention is also applicable to systems where other energy storage elements are employed, for example redox flow cells or capacitors, or to systems where at least part of the modules comprise energy conversion elements such as solar cells, fuel cells or thermocouple elements. Accordingly, wherever in the following description explanations are made with regard to a system based on batteries, it is to be understood that the corresponding disclosure should relate, where applicable, also to other forms of energy storage elements, or energy conversion elements, without further mention. In particular the term modular "energy storage" direct converter system shall not rule out the use of energy conversion elements instead of energy storage elements.

In a preferred embodiment, $U_{off}(t)$ is a constant offset $U_0$, wherein $U_0$ is chosen such that each star voltage $U_{Sj}$ is equal to zero once per period T, or that its absolute value differs from zero once per period T by less than 15%, preferably less than 10% and most preferably less than 5% of the maximum voltage value it acquires during each period T. For example, if the periodic bipolar AC function contribution $P_j(t)$ is sinusoidal, i.e. $P_j(t)=A \cdot \sin (\omega t+(j-1) \cdot 2\pi/N)$, with A being a voltage amplitude and $\omega=2\pi/T$, this criterion would correspond to a case where $U_0=A$, or where $U_0$ exceeds A by less than 15%, preferably less than 10% and most preferably less than 5%.

However, as will be explained further in the detailed description below, the energy efficiency can be further increased if the monopolar offset voltage $U_{off}(t)$ is chosen such that it is at each point in time as small as possible, while still keeping the star voltages $U_{Sj}$ at or above 0 V. This way, the average star voltages Us; necessary for producing a given set of phase-to-phase voltages are reduced, thereby allowing to either use less modules of same capacity in the MESDCS, i.e. to save hardware expense, or to operate the modules to be connected in parallel more frequently, to thereby reduce losses due to internal module resistance and hence increase the energy efficiency, or both. The skilled person will appreciate that in this regard, there are two factors that allow for generating desired output voltages with a comparatively small number of modules. The first factor is the use of phase-to-phase voltages, i.e. differences between star voltages rather than the star voltages themselves. For example, in case of three sinusoidal star voltages, the amplitudes of the phase-to-phase voltages exceed the voltages of the star voltages by a factor of $\sqrt{3}$. The second factor is an optimum choice of the monopolar offset voltage $U_{off}(t)$ which is chosen to be at each point in time as small as possible, while still keeping the star voltages $U_{Sj}$ at or above 0 V, Accordingly, in a preferred embodiment, $U_{off}(t)$ is a time-dependent offset chosen such that at each instance in time, one of said star voltages $U_{Sj}$ is equal to zero. This is the smallest possible choice for $U_{off}(t)$. Indeed, the energy saving associated with this choice is even bigger than what one would expect from the mere fact that fewer modules are needed or more modules can on average be connected in parallel. Namely, setting one of the star voltages $U_{Sj}$ to o means that all of its energy storage elements, e.g. batteries, are bypassed. However, this does not imply that at this point in time, the current through the corresponding MESDCS is zero. Instead, the MESDCS at 0 V is part in the generation of a non-zero phase-to-phase voltage, and it is in fact seen that in these situations, the current through the MESDCS is actually comparatively large or even maximum. Importantly, in this situation the current flows through the switches only, which have only minimal ohmic resistance and hence lead to very little electrical losses, but not through the batteries, where the predominant part of the losses tends to occur. Accordingly, this specific choice of $U_{off}(t)$ indeed helps for increasing the efficiency of the system as a whole. Nevertheless, this embodiment of invention is not limited to this optimum choice for $U_{off}(t)$, and good results can also be obtained in alternative embodiments in which $U_{off}(t)$ is chosen such that at each instance in time, the absolute value of one of said star voltages $U_{Sj}$ differs from zero by less than 15%, preferably less than 10% and most preferably less than 5% of the maximum absolute voltage value it acquires during each period T.

In a preferred embodiment, modules are two-quadrant-modules, and in particular modules, in which the plurality of module switches do not allow for connecting energy storage elements or energy conversion elements of adjacent modules in anti-series. Herein, the anti-series connection of an energy storage element or energy conversion element corresponds to a series connection with reversed polarity. The advantage of using such two-quadrant modules, as mentioned before, is that they need smaller numbers of switches, such as three or four switches only, as shown in FIGS. 3, and 4. Indeed, in preferred embodiments of this first aspect of the invention, the modules have not more than four module switches, preferably not more than three module switches.

In a preferred embodiment, each module has two first terminals and two second terminals, and said plurality of module switches allow for both, selectively deactivating or bypassing the energy storage element or energy conversion element of the corresponding module and connecting energy storage elements or energy conversion elements of adjacent modules in parallel. As explained above, by allowing for a parallel connection of modules, the internal resistance of the MESDCS can be reduced. Herein, "deactivating" an energy storage element in particular means to bypass it in a series or parallel connection of the adjacent modules on both sides, due to a corresponding operation of the module switches.

In a particularly preferred embodiment, said plurality of module switches allow for connecting the energy storage/ energy conversion elements of two non-adjacent modules, which are separated by one or more modules with deactivated storage/energy conversion elements, in parallel. This allows for full operation of the MESDCS even in a case where one of the energy storage elements is out of function, and further allows for avoiding losses due to balancing currents that could occur if modules with slightly deviating voltages are connected in parallel. Namely, this functionality allows for selecting even nonadjacent modules for parallel connection, and for selecting those modules for parallel connection that currently have most precisely matching voltages, to thereby decrease any losses due to balancing currents.

In a preferred embodiment, each module has two first terminals and two second terminals, wherein each energy storage element or energy conversion element has a first pole connected or connectable with one of the first terminals and a second pole connected or connectable with the other one of the first terminals, and wherein said plurality of module switches comprise
  a first switch having a first switch terminal connected with one of the second terminals of the module and a second switch terminal connected or connectable with the first pole of said energy storage/energy conversion element,
  a second switch having a first switch terminal connected with the other one of the second terminals of the module and a second switch terminal connected or connectable with the second pole of said energy storage/energy conversion element, and
  a third switch provided in a connection line connecting the first switch terminal of the first switch and the second switch terminal of the second switch,
  said module allowing for connecting its storage/energy conversion element in series with the storage/energy conversion element of an adjacent module connected to its second terminals by opening the first and second switches and closing the third switch, and for connecting its storage/energy conversion element in parallel with the storage/energy conversion element of an adjacent module connected to its second terminals by closing the first and second switches and opening the third switch.

In a preferred embodiment, each module further comprises a fourth switch connected either between the first pole of said storage/energy conversion element and the second switch terminal of the first switch, or between the second pole of said storage/energy conversion element and the second switch terminal of the second switch, said forth switch allowing for deactivating or bypassing the storage/energy conversion element of a given module in a series or parallel connection of storage/energy conversion elements of adjacent modules connected to the first terminals and second terminals of said given module, respectively.

While in the detailed disclosure preferred embodiments, modules are shown having two first terminals and two second terminals, the invention is not limited to this. Instead, the invention can also be practiced with modules having one first and one second terminal only, such as the modules first disclosed for use in a multilevel converter by Marquardt and e.g. described in DE10217889 A1.

In a preferred embodiment, the energy storage elements of the modules are batteries having a nominal voltage, wherein the nominal battery voltages are equal to or less than 25 V, preferably equal to or less than 15 V. In some embodiments, the nominal voltage may be 10 V or less, preferably 5 V or less. While such unusually low module voltages require a larger number of modules in the MESDCS to provide a given desired output voltage amplitude, such a variant is surprisingly cost efficient, in particular when using two-quadrant modules with three or four module switches only, and further allows for high energy efficiency. Indeed, the obvious design of the MESDCS would involve the use of modules with batteries of higher nominal voltage, e.g. commercially available 50 V batteries, such as to keep the number of modules and the switching effort low. However, the inventors noted that contrary to this common wisdom, using lower module battery voltages offers important advantages.

For example, if the nominal voltages of the batteries in the module is smaller, the switching speed requirements are relaxed. As the skilled person will appreciate, the higher the voltage to be switched is, the faster the switching must be in order to avoid switching energy losses. Accordingly, while smaller module battery voltages require a large number of modules and hence a larger number of switches for obtaining the same overall output voltage of the MESDCS, the hardware costs can be kept low if the switches do not have to provide for very high switching speeds.

Moreover, the skilled person will appreciate that batteries of higher voltages are usually constituted of a plurality of individual cells, each e.g. having a voltage of less than 5 V, and further incorporate a battery management system managing the charging states of the individual battery cells within said battery. Such battery management systems incur further costs and also electrical losses. According to preferred embodiments of the invention, the battery within each module does not comprise a battery management system of its own. Instead, any balancing and charge control of the battery may be provided by the operation of the MESDCS converter arm as a whole. In particular, in some embodiments of the invention, the nominal battery voltages are chosen so low that it can be furnished by a single battery cell per module.

The inventors noticed that the charge balancing function that would usually be carried out by the battery management system within each individual multi-cell battery can be established by the operation of the modules as part of the operation of the MESDCS. Namely, by selectively switching modules in series, and if applicable, also in parallel, it is possible to not only provide a desired star voltage at the second end of the MESDCS, but to concurrently control and/or adjust the charging states of the individual batteries. The advantage of being able to dispense with such ordinary battery management systems, and the corresponding costs and losses, may outweigh the additional effort for providing a larger number of modules. This is particularly true when employing modules that allow for parallel connection of batteries, and in particular allow for parallel connection of batteries that are separated by one or more modules with deactivated/bypassed battery, as this allows very low current losses, due to frequent parallel connection of modules, as well as an optimum nearly loss-free balancing of the battery cells distributed throughout the MESDCS.

In preferred embodiments, said module switches are semiconductor switches having a gate, and the gate voltage of at least one semiconductor switch of each module is provided by the battery of said module. This is different from prior art designs, where any gate voltages are typically provided by an external voltage source. However, according to this embodiment, the gate voltages of at least part of the module switches are obtained from module batteries, thereby making an external voltage supply for the gate voltages, as well as external wiring, dispensable.

This embodiment is particularly attractive in combination with the unusually low module voltages defined above. The nominal voltages of typical module batteries for the purpose of the invention would be too high for use as gate voltages. Suitable voltages could in principle be obtained by using DC/DC converters for converting the higher battery voltages to lower gate voltages of semiconductor switches, but this would significantly increase the module costs. When employing smaller module voltages, such DC/DC converters are not necessary, as the battery voltage may at least for some of the switches be directly used as a gate voltage.

In a preferred embodiment, said module switches are semiconductor switches having a gate, and the gate voltage of at least one semiconductor switch of each module is provided by the battery of another one of modules, in particular by the battery of a directly adjacent module. That is to say, for avoiding external voltage supply for the gate voltages of a semiconductor switch within a given module, it is not necessary to resort to the battery in the module itself, but it is also possible to resort to batteries within other modules within the MESDCS, and in particular to batteries within a neighboring module. This provides additional degrees of freedom for providing the voltages without switching conflicts and allows for failsafer designs.

In a particularly preferred embodiment, in a given module, a first group of switches among said module switches have their gate voltages provided by the battery of said given module, and a second group of switches among said module switches have their gate voltages provided by the battery of one or more different modules, in particular by the battery of a directly adjacent module. Herein, each of the first and second groups comprises one or more switches and said first and second groups are chosen such that in case the battery in the given module fails and any switch of said first group is no longer operative, the battery of said given module can be bypassed in one or both of a series connection of modules to both sides of said given module.

According to this embodiment, in each module there is a mixture of switches whose gate voltages are supplied by the the module's own battery, referred to as the "first group of switches", and switches whose gate voltage is supplied by batteries of other modules, referred to as the "second group of switches". In some cases, the first or second group could comprise a single switch only. The switches are assigned to the first and second groups in such a way that the failure of the battery within any given module (and as a result of that the failure of the switches that have their gate voltage supplied by this battery) do not lead to a failure of the MESDCS as a whole, as would usually be the case if all switches within a module would fail at the same time due to failure of the battery supplying the gate voltage. In this embodiment, failure of the MESDCS as a whole is avoided by assigning the switches to the first and second groups in such a way that the remaining switches not depending on the battery within the given module, i.e. the switches of the second group, ensure, in combination with those switches of the adjacent modules which are not depending on the battery in the given module, can be switched such that the battery of the given module can be bypassed without disrupting the further operation of the MESDCS. In particular, the switches may be assigned to the first and second groups in such a manner that the remaining switches within the given module not affected by the battery failure (second group of switches), as well as the switches in the adjacent modules which are not supplied with gate voltages by the battery in the given module, allow for bypassing the battery in the given module in a series connection of modules adjacent to the given module on both sides, in a parallel connection of modules adjacent to the given module on both sides, or both.

Clearly, the specific choice as to which of the switches shall be assigned to the first and second groups will depend on the respective design of the modules at hand, and the invention is not limited to any specific one of them. Instead, the skilled person will notice that for many given module designs, the possibility to resort to batteries of other modules for gate voltage supply, or in other words establishing the aforementioned "second group of switches", will allow for maintaining operability of the MESDCS as a whole in spite of individual battery failure. Nevertheless, with reference to the specific module recited above, a fail-proof MESDCS can be obtained when said first group of switches comprises the aforementioned "third switch" and the second group of switches comprises the aforementioned "first" and "second switches", as will become more apparent from the discussion of a specific embodiment below.

According to a second aspect of the present invention, an alternative system for providing N bipolar AC phase-to-phase voltages $U_{Vj}$, with j=1 . . . N is provided, in which four-quadrant modules are employed. The system according to this second aspect comprises, similar to the first aspect, N modular energy storage direct converter systems (MESDCS) and a control system, wherein each MESDCS comprises a converter arm having a first end and a second end and comprising a plurality of sequentially interconnected modules, wherein each module comprises at least one first terminal and at least one second terminal, a storage element for electrical energy, in particular a battery, or an energy conversion element, and a plurality of module switches, and wherein in each two adjacent modules the at least one first terminal of one module is connected either directly or via an intermediate component to the at least one second terminal of the other module.

Under control of said control system, said plurality of module switches allow for connecting energy storage elements or energy conversion elements of adjacent modules in series, and for selectively deactivating or bypassing the energy storage element or energy conversion element of each module and/or for connecting energy storage elements or energy conversion elements of adjacent modules in parallel.

The first ends of each MESDCS are connected to a common floating connection point, and the j-th MESDCS is controllable, by said control system, to output a star voltage $U_{Sj}$ with respect to the floating connection point, with j=1, . . . , N.

As in the first aspect, the system according to the second aspect of the invention is likewise configured to provide each of said phase-to-phase voltages $U_{Vj}$ as voltage differences between two of said star voltages, such that $U_{Vj}=U_{Sj+1}-U_{Sj}$, or $U_{Vj}=U_{Sj}-U_{Sj+1}$ for each j between 1 and N−1, and $U_{VN}=U_{S1}-U_{SN}$, or $U_{VN}=U_{SN}-U_{S1}$, respectively.

However, according to the second aspect of the invention, the control system is configured to control each MESDCS to output a corresponding bipolar star voltage $U_{Sj}$ that can be decomposed into a bipolar AC function $P_j(t)$ and a bipolar offset $U_{off}(t)$ that is common to each star voltage $U_{Sj}$, such that $U_{Sj}=P_j(t)+U_{off}(t)$. Herein, the periodic bipolar AC functions $P_j(t)$ associated with different star voltages $U_{Sj}$ are phase-shifted copies of each other such that for each integers i, j chosen from [i, . . . , N] and k chosen from [1, . . . , N−1], $P_i(t)=P_j(t+k \cdot T/N)$, wherein T is the period of said periodic bipolar AC function $P_j(t)$. In particularly preferred embodiments, $P_i(t)=P_j(t+(i−j) \cdot T/N)$. Moreover, $U_{off}(t)$ is such that for each star voltage $U_{Sj}$, the difference between the maximum and minimum values acquired during a full period T is less than without such offset.

For example, in one embodiment $P_j(t)=A \cdot \sin(\omega t+(j−1) \cdot 2\pi/N)$, with A being a voltage amplitude and $\omega$ an angular frequency, and $U_{off}(t)$ is such that for each star voltage $U_{Sj}$, the difference between the maximum and minimum values acquired during a full period $2\pi/\omega$ is less than $2 \cdot A$.

According to this second aspect, in operation, each of the MESDCS is suitable for outputting bipolar star voltages $U_{Sj}$, while according to the first aspect, the MESDCS were only configured for outputting unipolar star voltages. For this purpose, the MESDCS may employ four-quadrant modules, such as the module shown in FIGS. 1 and 2, or two-quadrant modules together with a polarity reversing circuit comprising four additional switches for changing the polarity of the entire converter arm composed of said two-quadrant modules.

By using a floating star point, and by resorting to phase-to-phase voltages $U_{Vj}$ formed as differences of two star voltages $U_{Sj+1}$, $U_{Sj}$, it becomes again possible to add a common offset $U_{off}(t)$ to the star voltages which does not affect the phase-to-phase voltages $U_{Vj}$. This degree of freedom can then be used to reduce the peak voltages provided by the individual MESDCS during a full period T, such that the difference between the maximum and minimum values acquired during this full period is less than without the common offset voltage $U_{off}(t)$. This again allows for saving hardware expense, saving energy due to more frequent possibilities for parallel connection of modules, or both, as will be demonstrated with reference to a specific embodiments below.

Clearly, there are many different suitable choices of $U_{off}(t)$ that lead to the above effect, and the present invention is not limited to any particular one of them. In particular, is to be noted that with the MESDCS, practically any output waveform can be established, such that it is not necessary to use waveforms that are derivable from sign functions in a simple manner.

In a preferred embodiment, $U_{off}(t)=−(\text{Max}(P_j(t))+\text{Min}(P_j(t)))/2$, where $\text{Max}(P_j(t))$ is defined as the maximum value among each of the functions $P_j(t)$ at a given time instance t, and $\text{Min}(P_j(t))$ is defined as the minimum value among each of the functions $P_j(t)$ at a given time instance t.

In an alternative embodiment, $U_{off}(t)=L−\text{Max}(P_j(t))$, if $\text{Max}(P_j(t))>L$, and $U_{off}(t)=−L−\text{Min}(P_j(t))$, if $\text{Min}(P_j(t))<−L$, wherein $\text{Max}(P_j(t))$ is defined as the maximum value among each of the functions $P_j(t)$ at a given time instance t, and Min $(P_j(t))$ is defined as the minimum value among each of the functions $P_j(t)$ at a given time instance t, and L is a constant. In the important case N=3 and $P_j(t)=A\cdot\sin(\omega t+(j-1)\cdot 2\pi/N)$, $L=A\cdot\sqrt{3}/2$.

In preferred embodiments of the second aspect, said plurality of module switches allow for connecting energy storage elements or energy conversion elements of adjacent modules in anti-series, wherein the anti-series connection of an energy storage element or energy conversion element corresponds to a series connection with reversed polarity. This way, bipolar star voltages $U_{Sj}$ can be easily generated.

In a preferred embodiment of the second aspect as well, each module has two first terminals and two second terminals, and wherein said plurality of module switches allow for both, selectively deactivating or bypassing the energy storage element or energy conversion element of the corresponding module and connecting energy storage elements or energy conversion elements of adjacent modules in parallel.

In preferred embodiments of the system of the second aspect, the plurality of module switches again allow for connecting the storage/energy conversion elements of two non-adjacent modules, which are separated by one or more modules with deactivated storage/energy conversion elements, in parallel.

In preferred embodiments of systems according to either the first or the second aspect, the number N of bipolar AC phase voltages is equal to 3.

In preferred embodiments of either the first or the second aspect, the system is connected to a load comprising N impedances $Z_j$, j=1, 2, . . . N, connected in a ring configuration, wherein the k-th impedance $Z_k$ is connected between the second ends of the k-th and (k+1)-th MESDCS, such that the k-th phase-to-phase voltage $U_{vk}$ is applied across the k-th impedance $Z_k$, with k=1, . . . , N–1, and the N-th impedance $Z_N$ is connected between the second ends of the N-th and the first MESDCS, and wherein the load is preferably an electric motor, more preferably an electric motor of an electric vehicle. In other embodiments, the system can be used for exchanging energy with an electrical network, such as a mains network, which in this case would form the "load". In such embodiments, a transformer may be used which transforms the phase-to-phase voltages of the system into star voltages to be supplied to or from the electrical network.

It is further emphasized that the advantageous design of the modules described above with reference to the first embodiment, and in particular with respect to the specific structure of the three- and four-switch modules, the preferred battery voltage ranges, the provision of gate voltages for semiconductor switches by batteries within a given module or batteries from another module, and the purposeful assigning of switches to the above-mentioned first and second group of switches such as to avoid MESDCS malfunction due to a battery failure apply for the second embodiment as well. In other words, each of the specifically described module designs can be employed in advantageous embodiments of the second embodiment as well.

Indeed, the preferred MESDCS module designs form a third aspect of the invention which is not limited to the specific MESDCS systems for providing phase-to-phase voltages as described with reference to the first and second aspects above. Instead, according to a third aspect, disclosed herein is a MESDCS comprising a control system and a converter arm having a first end and a second end and comprising a plurality of sequentially interconnected modules, wherein each module comprises at least one first terminal and at least one second terminal, a battery, and a plurality of module switches. In each two adjacent modules, the at least one first terminal of one module is connected either directly or via an intermediate component to the at least one second terminal of the other module. Under control of said control system, said plurality of module switches allow for connecting batteries of adjacent modules in series, and for selectively deactivating or bypassing the battery of each module and/or for connecting batteries of adjacent modules in parallel.

In this MESDCS according to the third aspect, the module switches are semiconductor switches having a gate, and the gate voltage of at least one semiconductor switch of each module is provided by the battery of said module and/or the gate voltage of at least one semiconductor switch of each module is provided by the battery of another one of modules, in particular by the battery of a directly adjacent module.

In a preferred embodiment of the MESDCS according to the third aspect, in a given module, a first group of switches among said module switches have their gate voltages provided by the battery of said given module, and a second group of switches among said module switches have their gate voltages provided by the battery of one or more different modules, in particular by the battery of a directly adjacent module, wherein each of the first and second groups comprises one or more switches and wherein said first and second groups are chosen such that in case the battery in the given module fails and any switch of said first group is no longer operative, the battery of said given module can be bypassed in one or both of a series connection and a parallel connection of modules to both sides of said given module.

In a preferred embodiment of the MESDCS according to the third aspect, each module has two first terminals and two second terminals, wherein each energy storage element or energy conversion element has a first pole connected or connectable with one of the first terminals and a second pole connected or connectable with the other one of the first terminals, and wherein said plurality of module switches comprise a first switch having a first switch terminal connected with one of the second terminals of the module and a second switch terminal connected or connectable with the first pole of said energy storage/energy conversion element, a second switch having a first switch terminal connected with the other one of the second terminals of the module and a second switch terminal connected or connectable with the second pole of said energy storage/energy conversion element, and a third switch provided in a connection line connecting the first switch terminal of the first switch and the second switch terminal of the second switch, said module allowing for connecting its energy storage/energy conversion element in series with the energy storage/energy conversion element of an adjacent module connected to its second terminals by opening the first and second switches and closing the third switch, and for connecting its energy storage/energy conversion element in parallel with the storage/energy conversion element of an adjacent module connected to its second terminals by closing the first and second switches and opening the third switch.

In a related embodiment, each module further comprises a fourth switch connected either between the first pole of said storage/energy conversion element and the second switch terminal of the first switch, or between the second pole of said storage/energy conversion element and the second switch terminal of the second switch, said forth switch allowing for deactivating or bypassing the storage/energy conversion element of a given module in a series or parallel connection of storage/energy conversion elements of adjacent modules connected to the first terminals and second terminals of said given module, respectively.

Herein, preferably, the aforementioned first group of switches comprises the third switch and the aforementioned second group of switches comprises the first and second switches.

In the MESDCS according to the third aspect, the energy storage elements of the modules are batteries having a nominal voltage, wherein the nominal battery voltages are equal to or less than 25 V, preferably equal to or less than 15 V, more preferably equal a less than 10 V, and most preferably equal or less than 5 V.

In a preferred embodiment, the batteries within a module do not comprise a battery management system of their own.

The invention further relates to a method for providing N bipolar AC phase voltages $U_{Vj}$, with j=1 . . . N using N modular energy storage direct converter systems (MESDCS), which method is closely related to the first aspect of the invention, wherein each MESDCS comprises a converter arm having a first end and a second end and comprising a plurality of sequentially interconnected modules, wherein each module comprises at least one first terminal and at least one second terminal, a storage element for electrical energy, in particular a battery, or an energy conversion element, and a plurality of module switches, wherein in each two adjacent modules, the at least one first terminal of one module is connected either directly or via an intermediate component to the at least one second terminal of the other module, wherein said method comprises operating said plurality of module switches for connecting energy storage elements or energy conversion elements of adjacent modules in series, and for selectively deactivating or bypassing the energy storage element or energy conversion element of each module and/or for connecting energy storage elements or energy conversion elements of adjacent modules in parallel, wherein the first ends of each MESDCS are connected to a common floating connection point, and wherein the j-th MESDCS is controlled to output at its second end a star voltage $U_{Sj}$ with respect to the floating connection point, with j=1, . . . , N, wherein the method comprises providing each of said phase voltages $U_{Vj}$ as voltage differences between two of said star voltages, such that $U_{Vj}=U_{Sj+1}-U_{Sj}$, or $U_{Vj}=U_{Sj}-U_{Sj+1}$ for each j between 1 and N−1, and $U_{VN}=U_{S1}-U_{SN}$, or $U_{VN}=U_{SN}-U_{S1}$, respectively, wherein each MESDCS is controlled to output a corresponding unipolar star voltage $U_{Sj}$ that can be decomposed into a periodic bipolar AC function $P_j(t)$ and a unipolar offset $U_{off}(t)$ that is common to each star voltage $U_{Sj}$, such that $U_{Sj}(t)=P_j(t)+U_{off}(t)$, wherein the absolute value of said common unipolar offset $U_{off}(t)$ is at all times t sufficiently high that $U_{Sj}(t)$ is unipolar, wherein the periodic bipolar AC functions $P_j(t)$ associated with different star voltages $U_{Sj}$ are phase-shifted copies of each other such that for each integers i, j chosen from [1, . . . , N] and k chosen from [1, . . . , N−1], $P_i(t)=P_j(t+k\cdot T/N)$, wherein T is the period of said periodic bipolar AC function $P_j(t)$, wherein in particular, $P_i(t)=P_j(t+(i-j)\cdot T/N)$.

In a preferred embodiment of this method, $U_{off}(t)$ is a constant offset $U_0$, wherein $U_0$ is chosen such that each star voltage $U_{Sj}$ is equal to zero once per period T, or that its absolute value differs from zero once per period T by less than 15%, preferably less than 10% and most preferably less than 5% of the maximum absolute voltage value it acquires during each period T.

In an alternative embodiment of this method, $U_{off}(t)$ is a time-dependent offset chosen such that at each instance in time, one of said star voltages $U_{Sj}$ is equal to zero, or that its absolute value differs from zero by less than 15%, preferably less than 10% and most preferably less than 5% of the maximum absolute voltage value it acquires during each period T.

In preferred embodiments, this method uses a system according to one of the embodiments recited above with reference to the first aspect of the invention.

The invention further relates to method for providing N bipolar AC phase voltages $U_{Vj}$, with j=1 . . . N using N modular energy storage direct converter systems (MESDCS), which is closely related to the second aspect of the invention, wherein each MESDCS comprises a converter arm having a first end and a second end and comprising a plurality of sequentially interconnected modules, wherein each module comprises at least one first terminal and at least one second terminal, a storage element for electrical energy, in particular a battery, or an energy conversion element, and a plurality of module switches, wherein in each two adjacent modules the at least one first terminal of one module is connected either directly or via an intermediate component to the at least one second terminal of the other module, wherein the method comprises operating said plurality of module switches for connecting energy storage elements or energy conversion elements of adjacent modules in series, and for selectively deactivating or bypassing the energy storage element or energy conversion element of each module and/or for connecting energy storage elements or energy conversion elements of adjacent modules in parallel, wherein the first ends of each MESDCS are connected to a common floating connection point, and wherein the j-th MESDCS is controlled to output a star voltage $U_{Sj}$ with respect to the floating connection point, with j=1, . . . , N, wherein the method comprises providing each of said phase voltages $U_{Vj}$ as voltage differences between two of said star voltages, such that $U_{Vj}=U_{Sj+1}-U_{Sj}$, or $U_{Vj}=U_{Sj}-U_{Sj+1}$ for each j between 1 and N−1, and $U_{VN}=U_{S1}-U_{SN}$, or $U_{VN}=U_{SN}-U_{S1}$, respectively, wherein each MESDCS is controlled to output a corresponding bipolar star voltage $U_{Sj}$ that can be decomposed into a bipolar AC function $P_j(t)$ and a bipolar offset $U_{off}(t)$ that is common to each star voltage $U_{Sj}$, such that $U_{Sj}=P_j(t)+U_{off}(t)$, wherein the periodic bipolar AC functions $P_j(t)$ associated with different star voltages $U_{Sj}$ are phase-shifted copies of each other such that for each integers i, j chosen from [1, . . . , N] and k chosen from [1, . . . , N−1], $P_i(t)=P_j(t+k\cdot T/N)$, wherein T is the period of said periodic bipolar AC function $P_j(t)$, and wherein preferably, $P_i(t)=P_j(t+(i-j)\cdot T/N)$, and wherein $U_{off}(t)$ is such that for each star voltage $U_{Sj}$, the difference between the maximum and minimum values acquired during a full period T is less than without such offset.

In preferred embodiments, this method is carried out using a system according any one of the embodiments described with reference to the second aspect of the invention above.

SHORT DESCRIPTION OF THE FIGURES

Figures 16, 17:
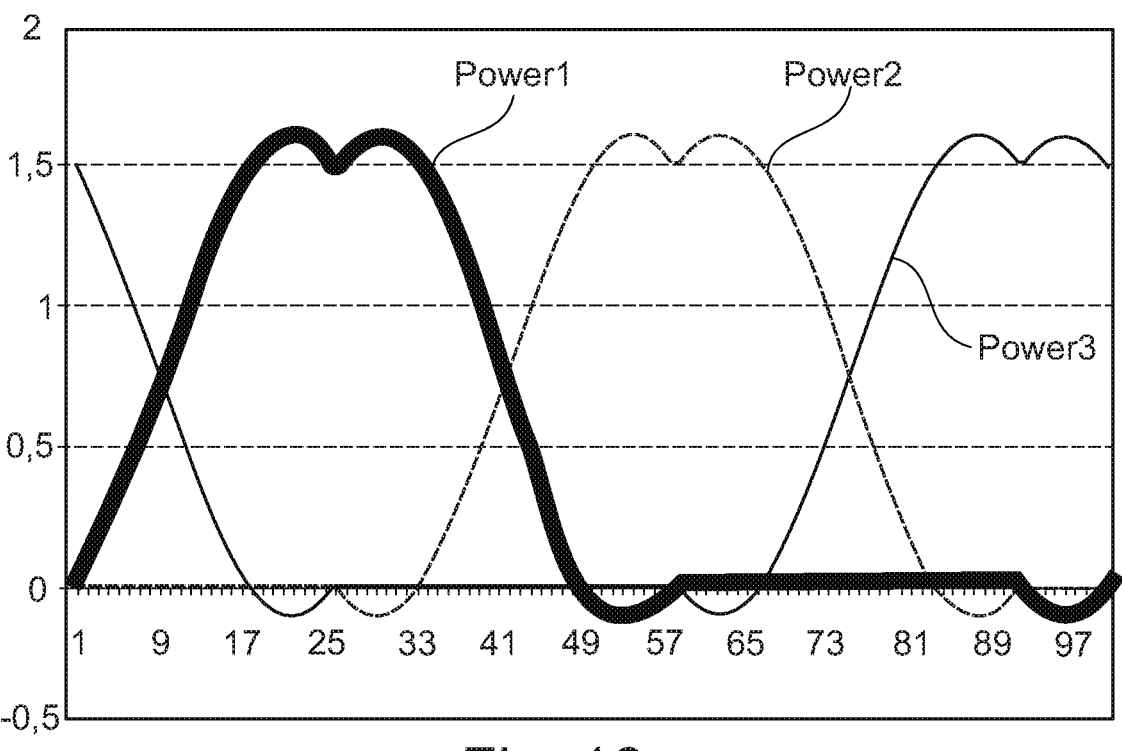
FIG. 16 shows the power of the MESDCS when using the optimized time-dependent common offset to the star voltages.

FIG. 17 schematically shows a system using three MESDCS that are only capable of generating unipolar star voltages.

Figures 18, 19:
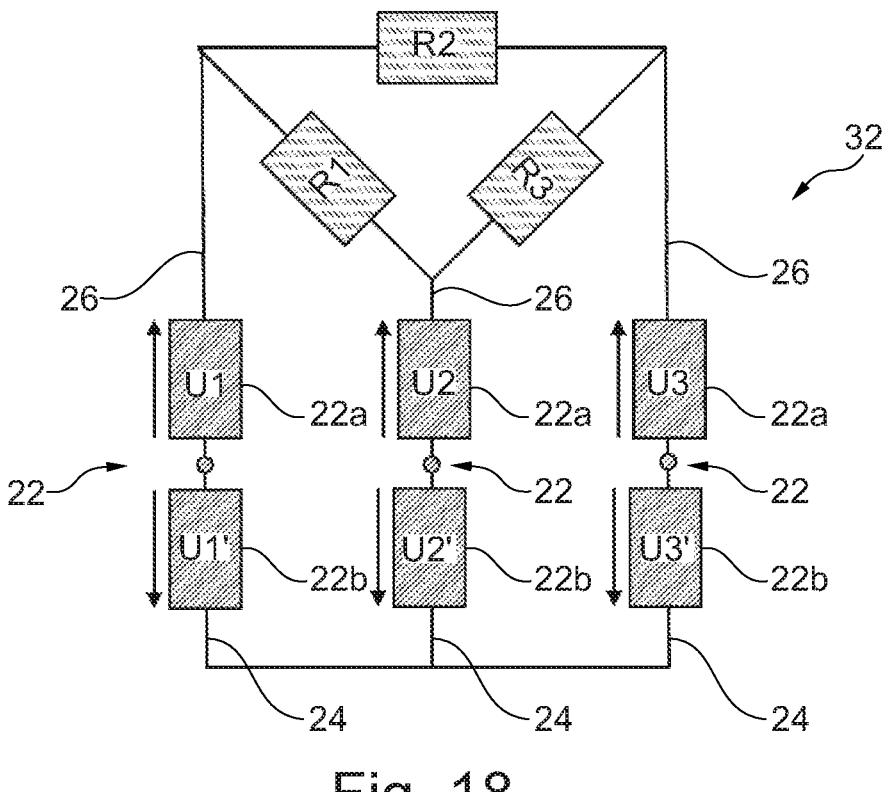

FIG. 18 schematically shows a system with three MESDCS capable of generating bipolar star voltages, based on two-quadrant modules.

FIG. 19 schematically shows a system with three MESDCS capable of generating bipolar star voltages, based on four-quadrant modules.

Figure 20:
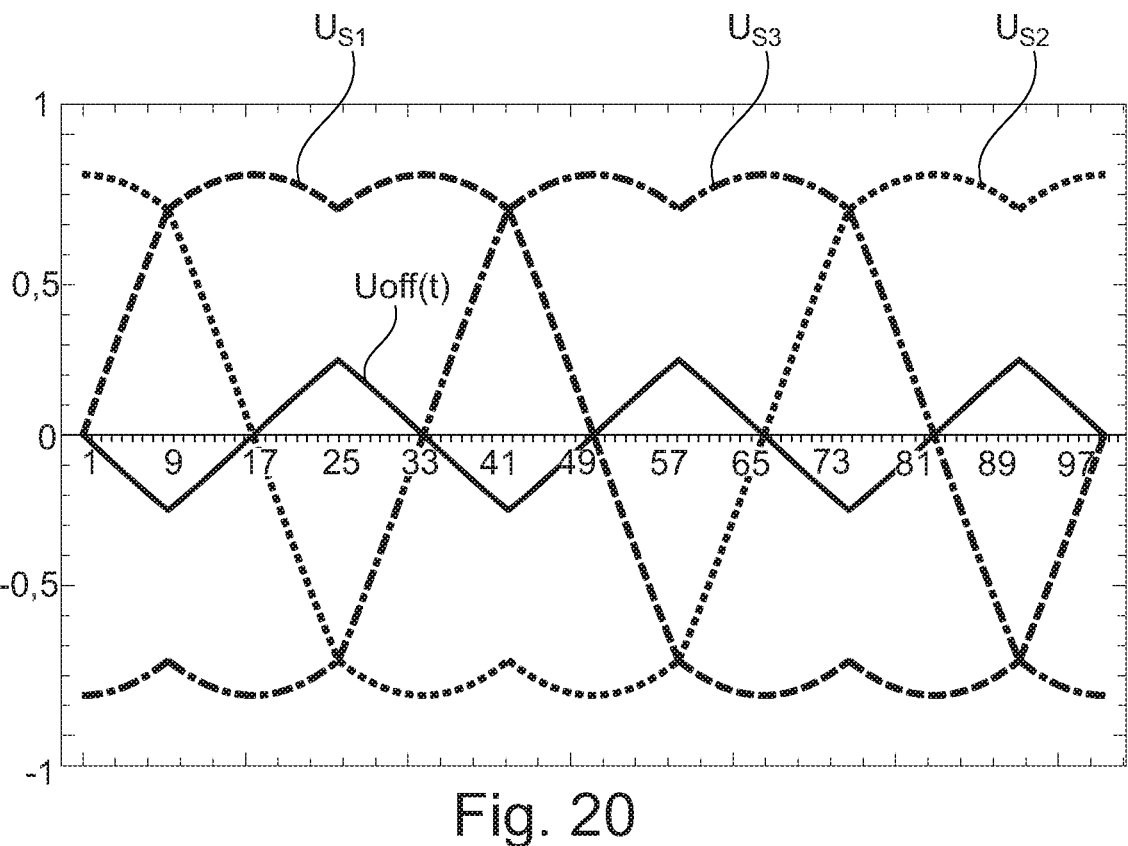

FIG. 20 shows optimized star voltages that can be employed in the systems of FIG. 18 or 19.

Figure 21:
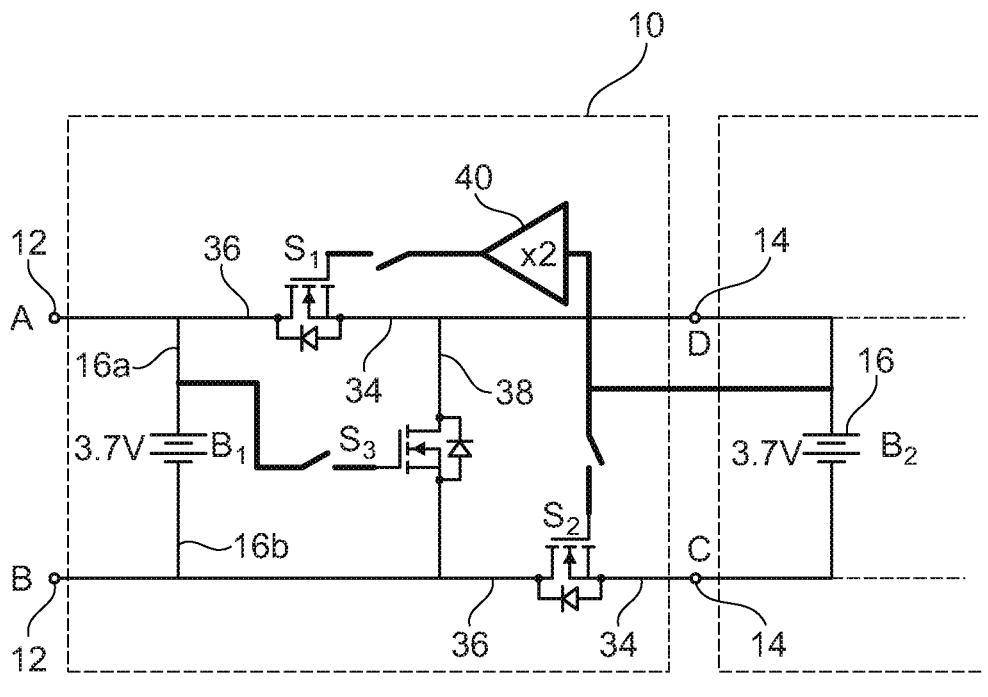

FIG. 21 shows a module 10 where the module battery voltages match the gate voltages of semiconductor switches employed therein.

Figure 22:
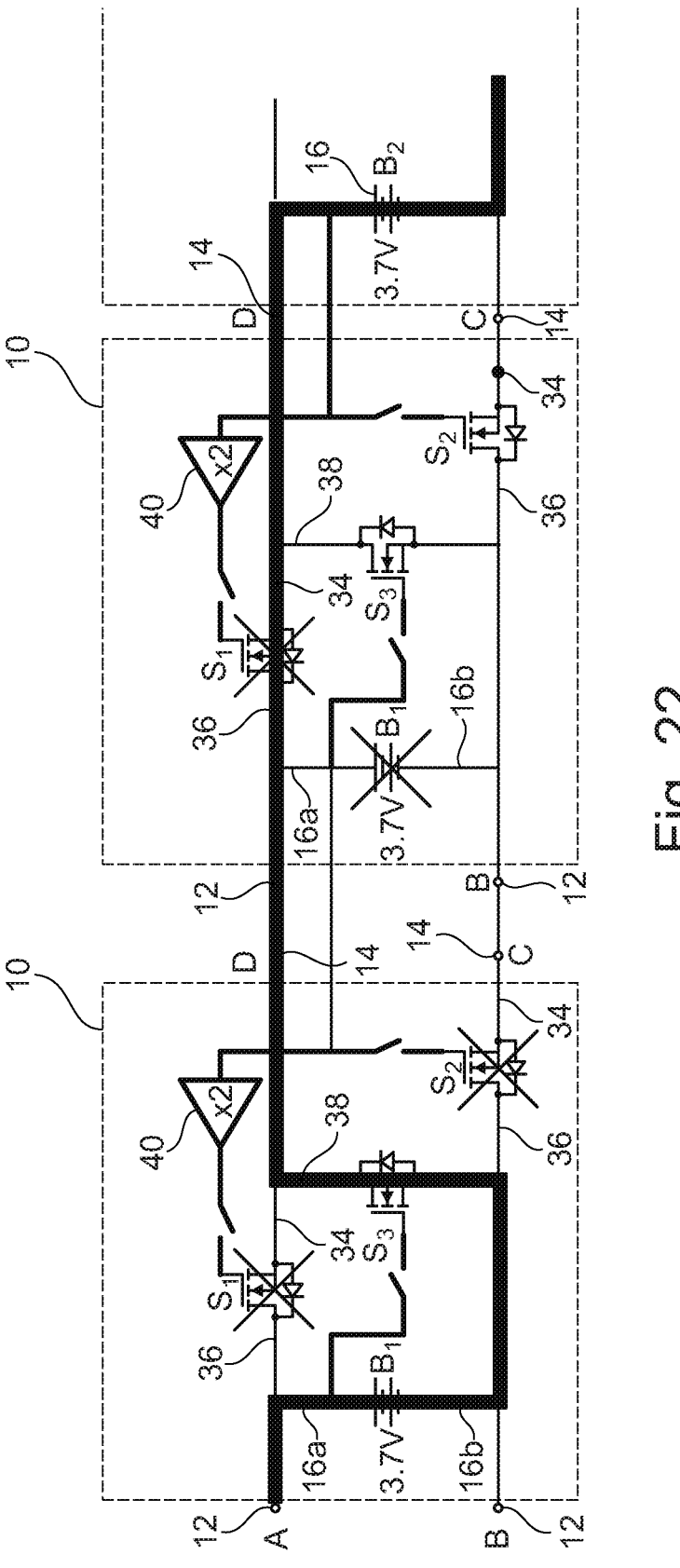

FIG. 22 shows two complete modules and part of a third module of the type shown in FIG. 21, illustrating how module with a dysfunctional battery can be bypassed.

DESCRIPTION OF THE PREFERRED EMBODIMENTS

Figure 5:
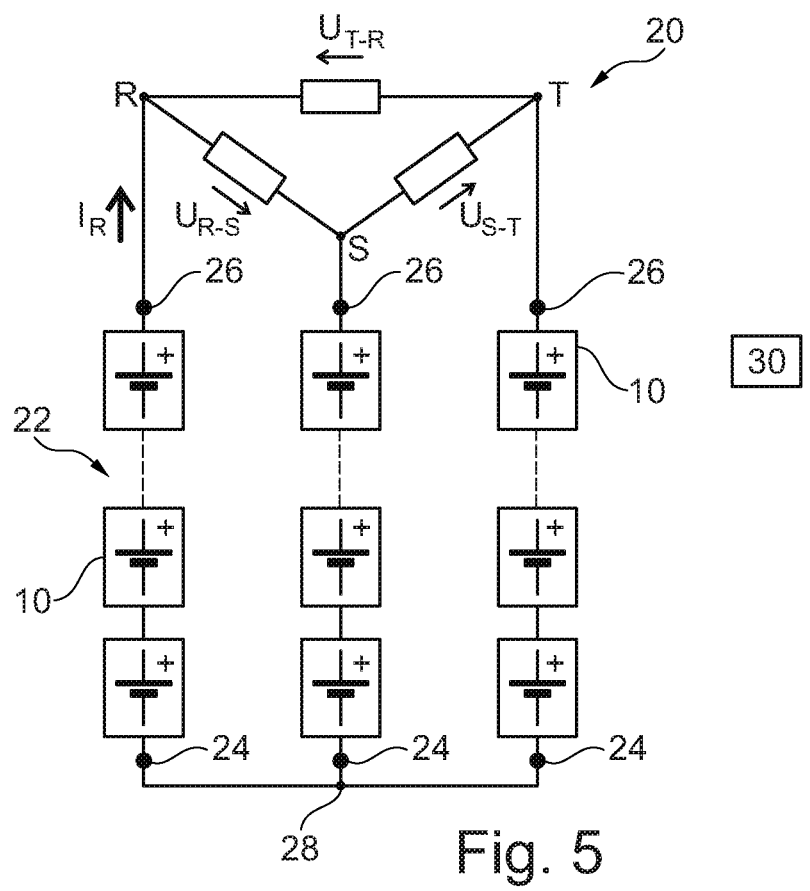
FIG. 5 is a schematic representation of a system according to a first aspect of the invention.

FIG. 5 shows a system 20 for providing three AC phase voltages. The system comprises three modular energy storage direct converter systems (MESDCS) 22, each comprising a converter arm having a first end 24 and a second end 26 and comprising a plurality of sequentially interconnected modules 10 which in FIG. 5 are only symbolically represented. Each of the first ends 24 of the MESDCS 22 are connected to a common floating connection point 28. In other words, the MESDCS 22 are connected in a star configuration, but the common floating connection point 28 is not a "star point" in the usual sense, because its potential can vary upon operation of the system 20, and can hence not necessarily be used as the "star point" of an electrical machine.

Figures 1, 2, 3:
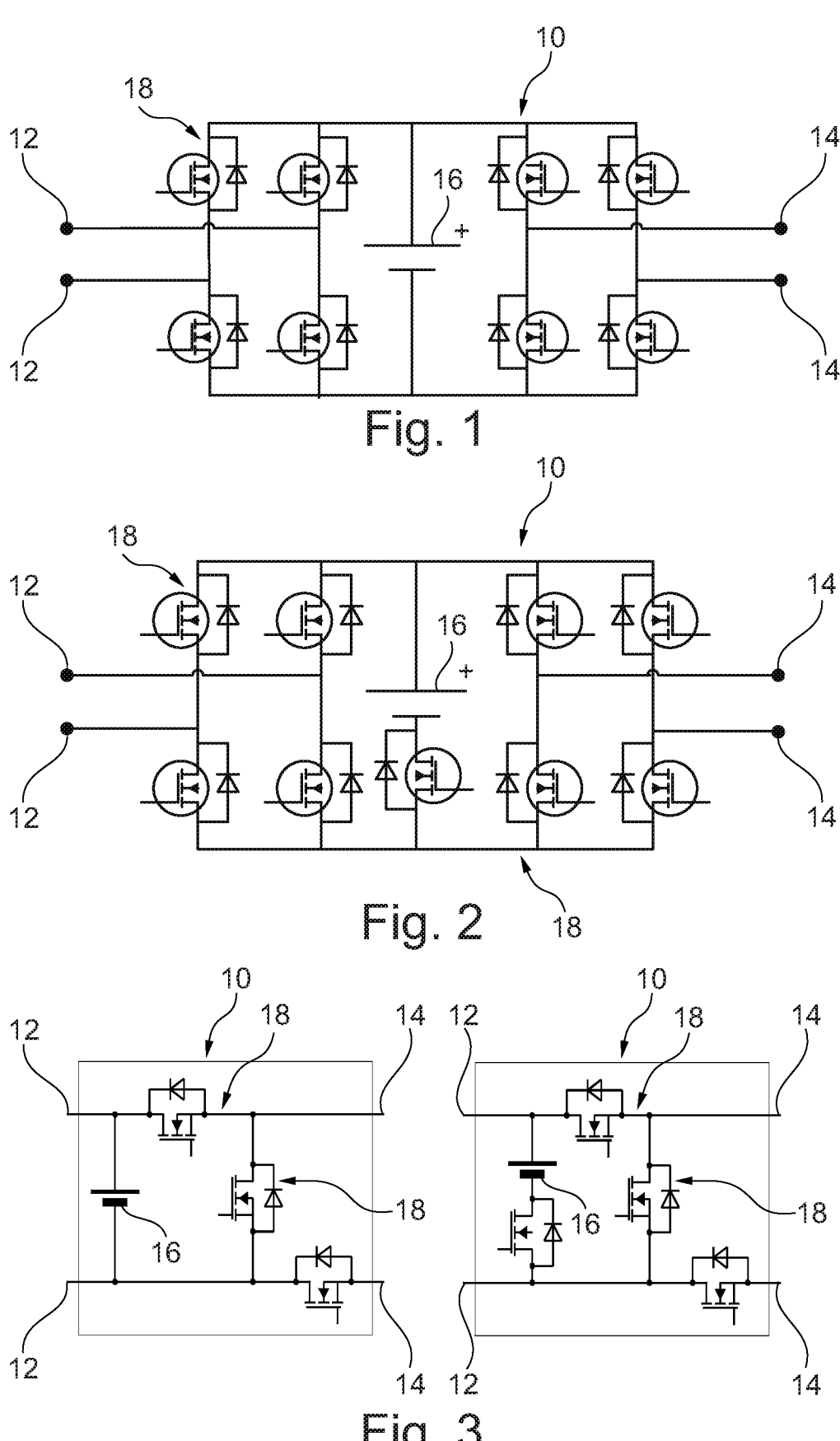
FIG. 1 shows a four-quadrant-module for use in an MESDCS having eight switches.
FIG. 2 shows a four-quadrant-module for use in an MESDCS having nine switches.
FIG. 3 shows on the left a two-quadrant-module for use in an MESDCS having three module switches, and on the right a further two-quadrant-module for use in an MESDCS having four module switches.
Figure 6:
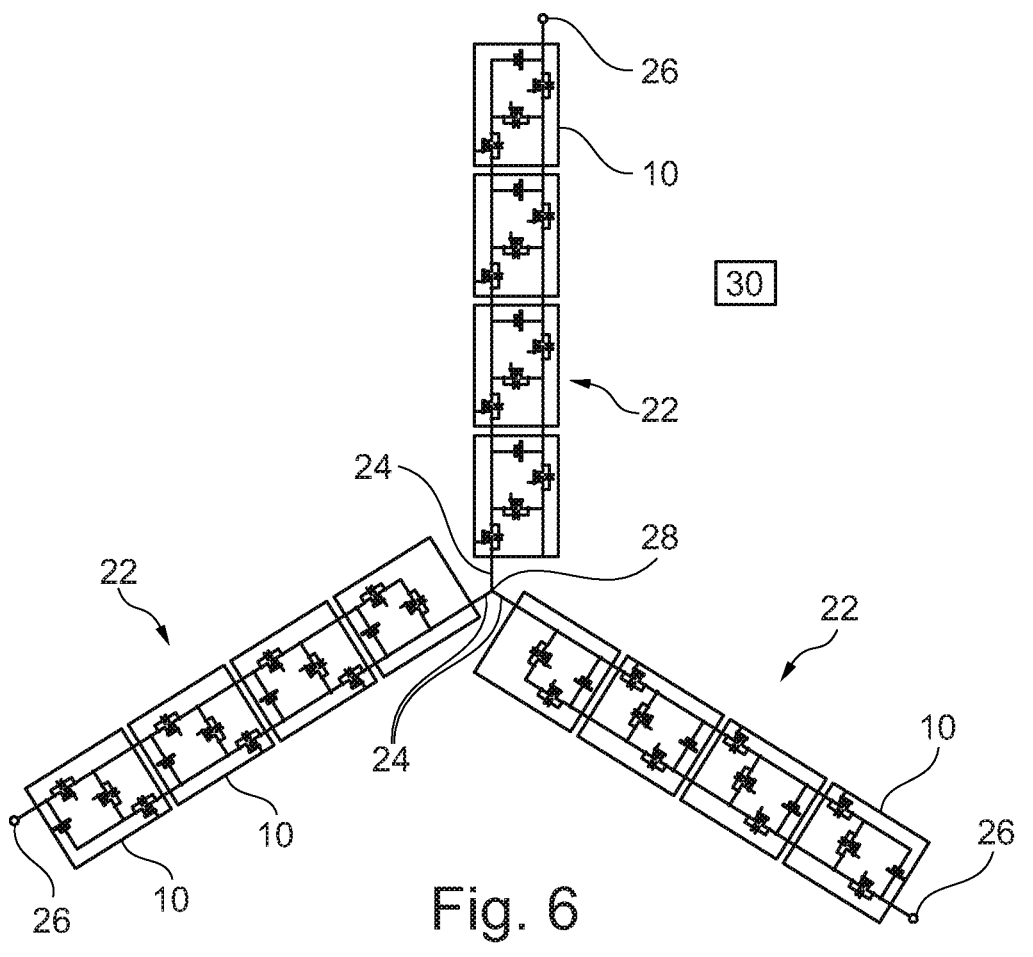
FIG. 6 shows three MESDCS connected in a star configuration that could be used in the system of FIG. 5.

FIG. 6 shows a more detailed example of three MESDCS converter arms 22 arranged in star configuration, where each converter arm is shown to have four modules 10, which are of the type shown in FIG. 3. Note that in practical applications, the number of modules 10 would typically be much larger than this.

With reference again to FIG. 5, the system 20 further comprises a control system 30 which is configured to control the switches within each of the modules 10 of the MESDCS 22 such as to generate a corresponding star voltage at the second end 26 of each MESDCS converter arm 22 (note that in the description of FIG. 5, the terms "MESDCS and "converter arm" may be used synonymously, since each MESDCS 22 comprises only one converter arm). The control system 30 can be provided by hardware, by software or a combination of both. For example, the control system 30 may comprise one or more microprocessors carrying out the control of the MESDCS 22, and in particular the control of the operation of the module switches 18 comprised in the modules 10, under control of a corresponding software code. Additionally or alternatively, the control system 30 may comprise one or more ASICs or FPGAs. The control system 30 may comprise a single control unit, or a plurality of control units which are in data or signal communication with each other. Signal links are provided to connect the control system 30 with the MESDCS 22 and their respective modules 10, which are, however, not shown in the figures for clarity. The signal links could be formed by wired or wireless connections.

FIG. 5 shows a three phase system, in which the phases are conventionally designated by letters R, S, and T, and the star voltages would therefore often be referred to as $U_R$, $U_S$ and $U_T$ in the art. However, since the invention is not limited to systems with three phases, in the summary of the invention, a more general terminology was introduced, according to which the star voltages are designated as $U_{Sj}$, wherein the index $j=1, \ldots, N$ designates the corresponding phase. Accordingly, using the more general terminology for this specific three-phase case, one obtains $U_{S1}=U_R$, $U_{S2}=U_S$ und $U_{S3}=U_T$.

The system 20 of FIG. 5 provides three by polar AC phase voltages as phase-to-phase voltages, which are each generated as voltage differences between two of said three star voltages:

$U_{RS}=U_{V1}=U_{S1}-U_{S2}$;
$U_{ST}=U_{V2}=U_{S2}-U_{S3}$; and
$U_{TR}=U_{V3}=U_{S3}-U_{S1}$.

Moreover, in the system of FIG. 5, the load is formed by three resistors connected in a triangular configuration, where the star voltages Us, (corresponding to $U_R$), $U_{S2}$ (corresponding to $U_S$) and $U_{S3}$ (corresponding to $U_T$) are applied to the vertices of the triangle. In preferred embodiments, the load could be formed by an electric motor. In the embodiment shown, the MESDCS 22 comprises only two-quadrant-modules and the converter arm of the MESDCS 22 does not have a polarity reversing circuit, such that the star voltages $U_{Sj}$ are by construction unipolar. However, the phase-to-phase voltages $U_{Vj}$, which are based on differences between star voltages $U_{Sj+1}$, $U_{Sj}$ will be bipolar.

For example, in one embodiment, the star voltages $U_{Sj}$ may be sinusoidal voltages oscillating between 0V and a maximum voltage $U_0$, and with a mutual phase shift of T/3, where T is the period of the oscillation:

$$U_{S1}(t) = U_0 \cdot \left( \frac{1}{2} + \frac{1}{2} \cdot \sin(\omega t) \right);$$

$$U_{S2}(t) = U_0 \cdot \left( \frac{1}{2} + \frac{1}{2} \cdot \sin\left(\omega t + \frac{2\pi}{3}\right) \right);$$

$$U_{S3}(t) = U_0 \cdot \left( \frac{1}{2} + \frac{1}{2} \cdot \sin\left(\omega t + \frac{4\pi}{3}\right) \right)$$

In this case, the first phase-to-phase voltage $U_{V1}$ is given as:

$$U_{V1}(t) = U_0 \cdot \left( \frac{1}{2} + \frac{1}{2} \cdot \sin(\omega t) \right) - \left( \frac{1}{2} + \frac{1}{2} \cdot \sin\left(\omega t + \frac{2\pi}{3}\right) \right)$$

$$= \frac{1}{2} \cdot U_0 \cdot \left( \sin(\omega t) - \sin\left(\omega t + \frac{2\pi}{3}\right) \right)$$

$$= \frac{\sqrt{3}}{2} \cdot U_0 \cdot \sin\left(\omega t + \frac{\pi}{6}\right)$$

Figure 7:
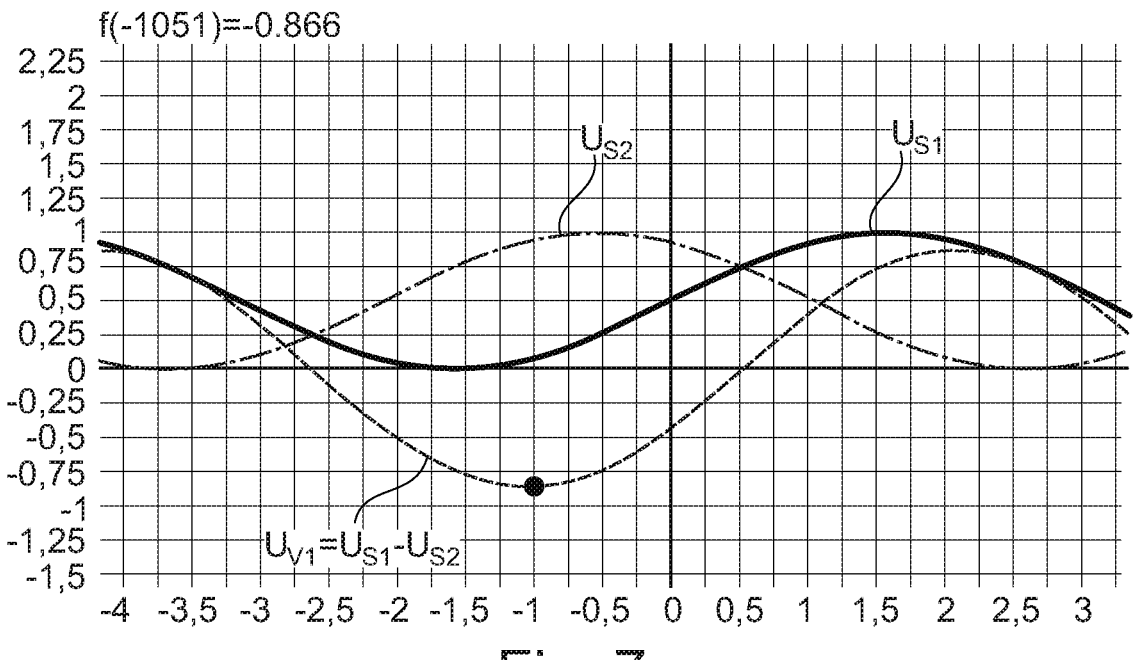
FIG. 7 shows two star voltages $U_{S1}$, $U_{S2}$ and a corresponding phase-to-phase voltage $U_{V1}=U_{S1}-U_{S2}$, assuming idealized sinusoidal voltage waveforms.

It is seen that the first phase-to-phase voltage $U_{V1}$ is a bipolar sinusoidal waveform having the same period T as the star voltages $U_{Sj}$, and an amplitude that is increased by a factor F. The corresponding curves $U_{S1}$, $U_{S2}$ and $U_{V1}$ are shown in FIG. 7.

Figure 8:
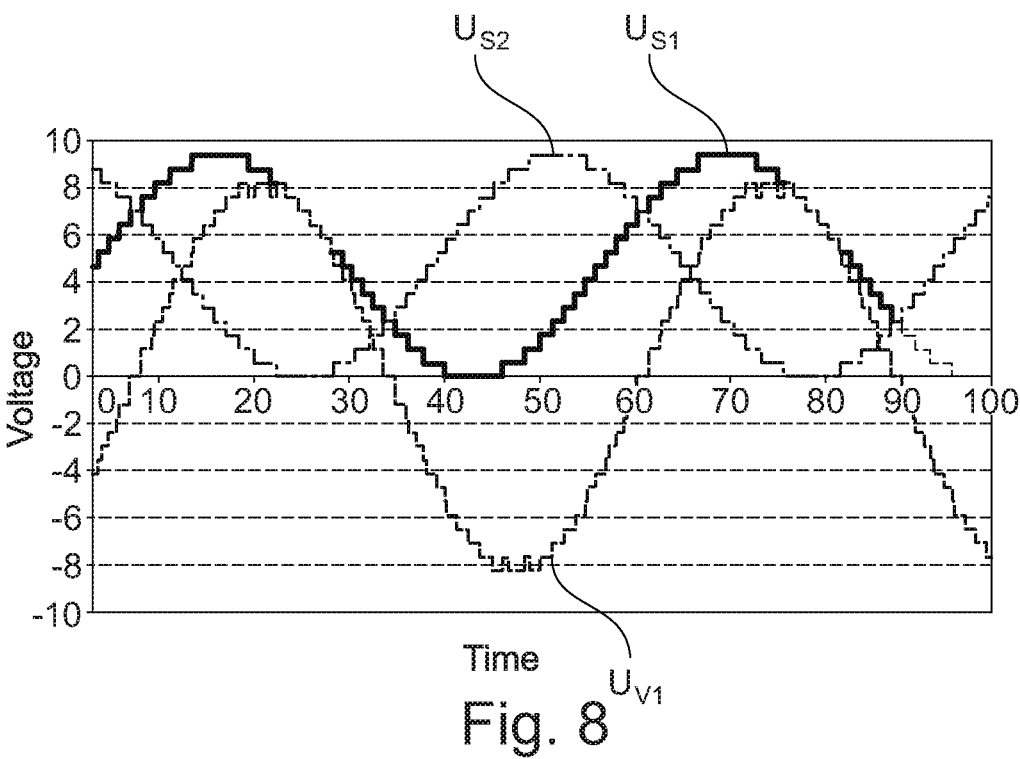
FIG. 8 shows voltage waveforms similar to those of FIG. 7 but as generated in a step-like manner by means of two MESDCS.

In the above description, it was assumed for simplicity that the star voltages $U_{Sj}$ were ideal sinus functions. FIG. 8 shows the corresponding voltage waveforms as generated by a typical MESDCS 22. Since the MESDCS 22 generates the star voltage $U_{Sj}$ by connecting a finite number of modules 10 in series, the output voltages can only acquire discrete values, which leads to the step-like behavior seen in FIG. 8. However, as used herein, a step-like waveform approximating a sinus function will be referred to as a sinus function herein as well, and the same understanding applies for the appending claims.

Note that in view of the symmetry of the star voltages $U_{Sj}$ and assuming a symmetric load, the sinusoidal phase-two-phase voltages will lead to sinusoidal currents in the MESDCS 22. This means that corresponding module batteries forming the "energy storage elements" 16 will also be periodically subjected to transient currents in "opposite direction", i.e. in a direction which leads to charging of the battery. The power Power1(t) as a function of time for the first MESDCS 22 (assuming an ohmic load) is hence obtained as:

$$Power_1(t) = U_0 \cdot \left( \frac{1}{2} + \frac{1}{2} \cdot \sin(\omega t) \right) \cdot I_0 \cdot \sin(\omega t)$$

-continued $$= \frac{1}{2} \cdot U_0 \cdot I_0 \cdot (\sin(\omega t) + \sin(\omega t))^2)$$

Figure 9:
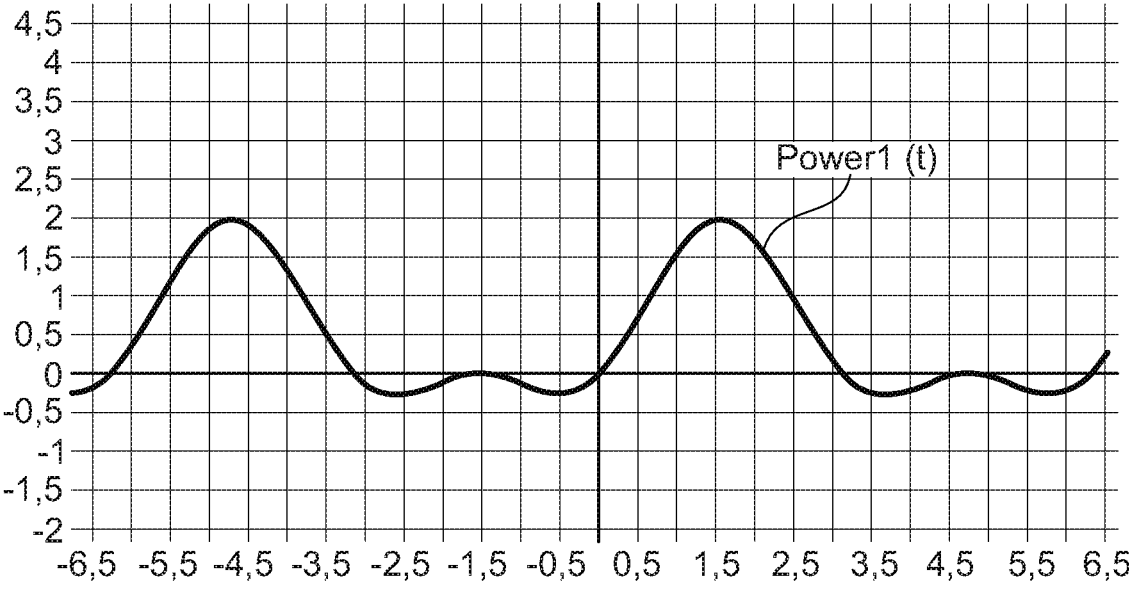
FIG. 9 shows the power of one of the MESDCS in operation as a function of time.

The corresponding waveform is shown in FIG. 9. Note, however, that the "opposite currents" only occur at time intervals where the corresponding star voltage $U_{Sj}$ is small, and hence at time intervals where the modules 10 are either bypassed or connected in parallel, such that the additional battery losses are in fact very small. Note that the fact that the battery is charged by "opposite currents" of course per se does not imply that the corresponding energy is lost, since the energy is stored in the battery. However, overall transferring energy to the battery and back to the load involves net losses.

In the discussion so far, it was assumed that the star voltages $U_{Sj}$ are sinusoidal but with a constant common offset that ensures that the star voltages are always positive:

$$U_{S1}(t) = U_0 \cdot (1 + \sin(\omega t))$$

Figure 10:
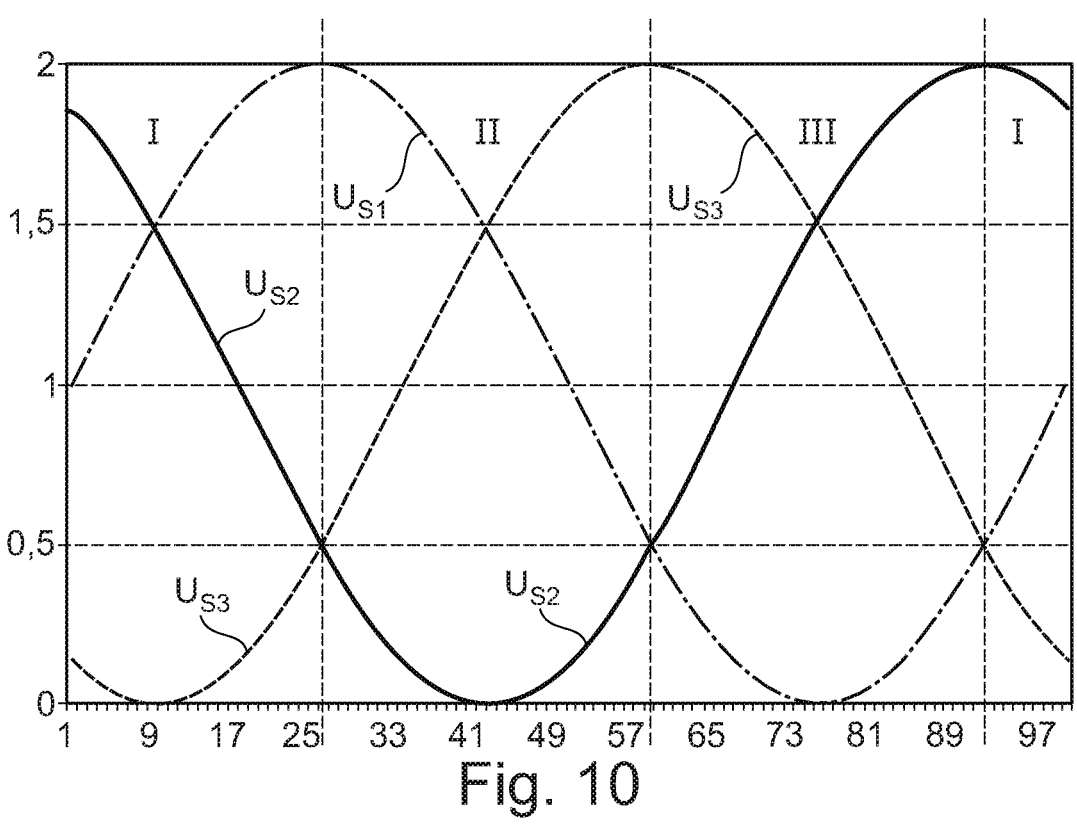
FIG. 10 shows three sinusoidal, monopolar star voltages $U_{S1}$, $U_{S2}$, $U_{S3}$ generated using a constant offset voltage $U_0$.
Figure 11:
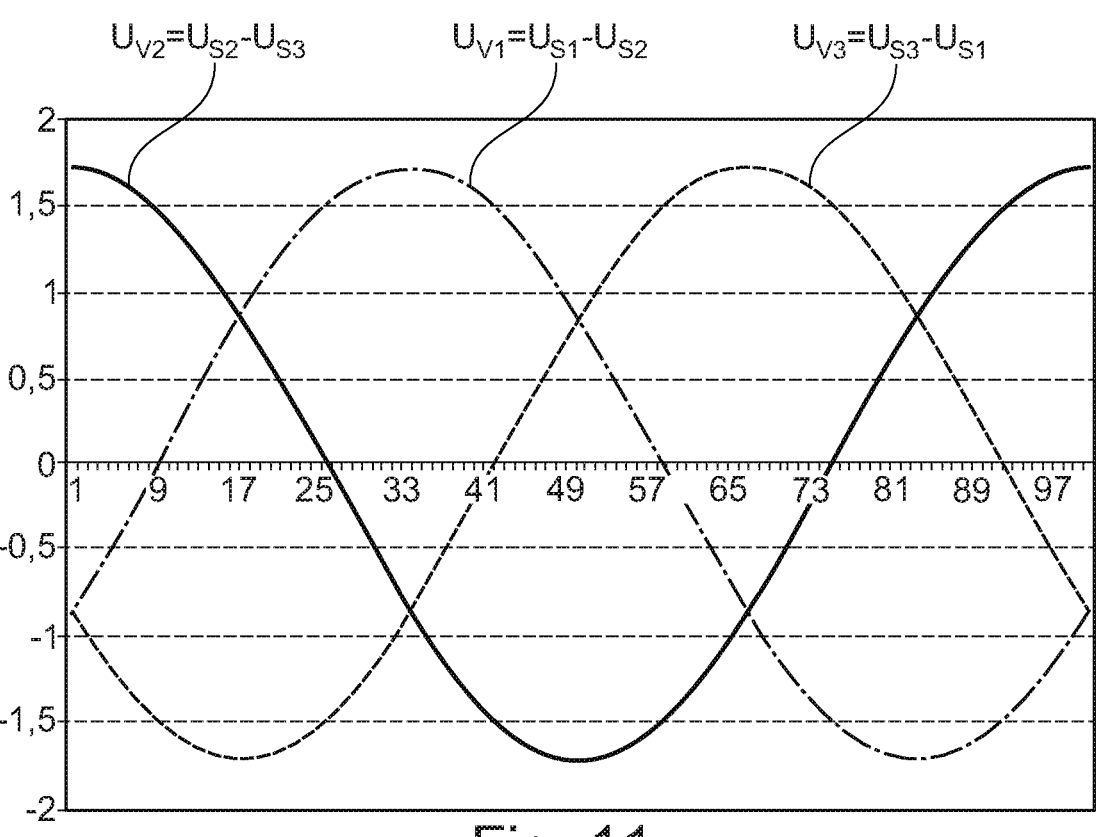
FIG. 11 shows the corresponding phase-to-phase voltages $U_{V1}$, $U_{V2}$, and $U_{V3}$.
Figures 12, 13:
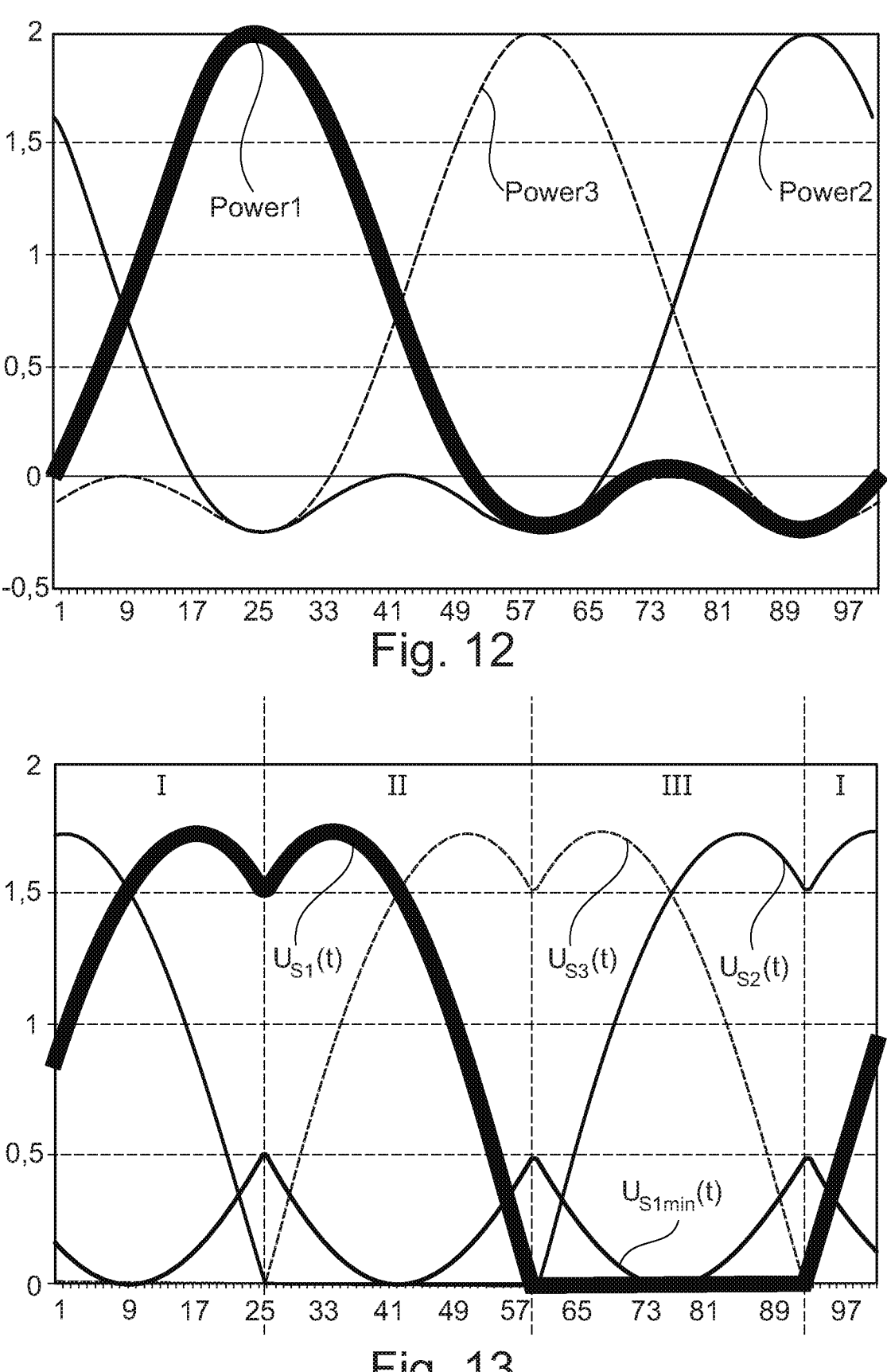
FIG. 12 shows the MESDCS powers associated with the three star voltages, similar to FIG. 11.
FIG. 13 shows optimized star voltages $U_{S1}$, $U_{S2}$ and $U_{S3}$ using a time-dependent common offset $U_{off}(t)$.

FIG. 10 summarizes all three star voltages $U_{S1}$, $U_{S2}$, and $U_{S3}$, which are seen to oscillate between zero and $2U_0$, and FIG. 11 shows the corresponding phase-to-phase voltages $U_{V1}$, $U_{V2}$, and $U_{V3}$. Finally, FIG. 12 shows the corresponding powers Power$_1$, Power$_2$, Power$_3$ of the MESDCS 22. Herein, the power associated with the first MESDCS 22 is shown with a thick line to better discern its waveform, while the powers associated with the second and third MESDCS are simply phase-shifted copies thereof.

The skilled person will appreciate that the constant common offset $U_0$ in this case is the smallest possible constant offset that ensures that the star voltages $U_{S1}$, $U_{S2}$, and $U_{S3}$, are larger than zero at all times, as they must be, since the MESDCS 22 are only capable of generating positive voltages in the shown embodiment. However, since the phase-to-phase voltages $U_{V1}$, $U_{V2}$, and $U_{V3}$ are based on differences between star voltages, any common offset to the star voltages does not have any effect on the phase-to-phase voltages, such that a higher constant offset would likewise be possible and lead to the same phase-to-phase voltages $U_{V1}$, $U_{V2}$, and $U_{V3}$. However, for reasons presented above, when keeping both, the average and the peak star voltages low, the efficiency both with regard to the use of hardware as well as the energy efficiency can be increased. Accordingly, if a constant offset $U_0$ is employed, it should indeed be chosen such that each star voltage $U_{Sj}$ is equal to o once per period T, or differs from zero once per period T by less than 15%, preferably less than 10%, and most preferably less than 5% of the maximum voltage value it acquires during each period.

Note that although reference has so far been made to sinusoidal star voltages and phase-to-phase voltages, the invention is not limited to this. Instead, according to the present invention, the star voltages $U_{Sj}$ can be any waveforms, as long as they can be decomposed into a periodic bipolar AC function $P_j(t)$ and a unipolar offset $U_{off}(t)$ that is common to each star voltage $U_{Sj}$, such that $U_{Sj}(t) = P_j(t) + U_{off}(t)$, wherein the absolute value of said common unipolar offset $U_{off}(t)$ is at all times t sufficiently high that $U_{Sj}(t)$ is unipolar, and wherein the periodic bipolar AC functions $P_j(t)$ associated with different star voltages $U_{Sj}$ are phase-shifted copies of each other such that for each integers i, j, chosen from [i, . . . , N] and k chosen from [i, . . . , N−1], $P_i(t) = P_j(t + k \cdot T/N)$, wherein T is the period of said periodic bipolar AC function $P_j(t)$, and in particular, $P_i(t) = P_j(t + (i−j) \cdot T/N)$.

In a further embodiment, the common offset is not a constant, but a time-varying function $U_{off}(t)$. This $U_{off}(t)$ can then be chosen such that the star voltages $U_j$ never become negative, and that, for a desired phase-to-phase voltage $U_{Vj}$, the star voltages $U_{Sj}$, $U_{Sj+1}$ reach a maximum value that is as low as possible. In the following, it is shown how such an optimum $U_{off}(t)$ can be derived for a sinusoidal three phase system.

The starting points of the derivation are the periodic bipolar AC functions $P_j(t)$ which contribute to the corresponding unipolar star voltages $U_{Sj}$, and which are chosen to give the desired phase-to-phase voltages $U_{Vj}$. In the present case, we obtain $P_j(t)=U_0 \cdot \sin(\omega t+(j-1) \cdot 2\pi/3)$. In a first step, a constant offset is determined, such that $U_{Sj}(t)$ is always larger than 0, and this constant offset is again $U_0$, leading to the star voltages $U_{Sj}$ as shown in FIG. 10.

Then, in each time interval, one subtracts a further time-dependent component from the common offset, which sets the star voltage that currently has the lowest voltage to 0. In other words, for each point in time, one determines the star voltage (with constant shift $U_0$) which has the lowest value, and subtracts this value, referred to as $U_{s,min}$, from the constant common offset. Accordingly, a time dependent offset $U_{off}(t)=U_0-U_{s,min}(t)$ is obtained. Herein, $U_{s,min}(t)$ is a function that is always larger than or equal to 0.

An analytical derivation for the resulting voltage for the first star voltage $U_{S1}$ will be presented next. With reference to FIG. 10, it is seen that in a first interval I (bounded by dashed vertical lines) ranging from ($\omega t=-\pi/6$ to $\pi/2$, $U_{S3}$ is the star voltage with the lowest value, i. e. $U_{S,min}=U_{S3}$. Accordingly, in the range $-\pi/6<\omega t=\pi/2$, we obtain:

$$U_{S1(t)}(t)/U_0 = (1+\sin(\omega t)) - \left(1 + \sin\left(\omega t + \frac{4\pi}{3}\right)\right)$$

$$= \sin(\omega t) - \sin\left(\omega t + \frac{4\pi}{3}\right)$$

$$= \sqrt{3} \cdot \sin\left(\omega t + \frac{\pi}{6}\right)$$

In a second region II ranging from $$\omega t = \frac{\pi}{2} \text{ to } 7\frac{\pi}{6},$$

we obtain:

$$U_{S1(t)}(t)/U_0 = (1+\sin(\omega t)) - \left(1 + \sin\left(\omega t + \frac{2\pi}{3}\right)\right)$$

$$= \sin(\omega t) - \sin\left(\omega t + \frac{2\pi}{3}\right)$$

$$= \sqrt{3} \cdot \sin\left(\omega t - \frac{\pi}{6}\right)$$

Finally, in the third region III from $$\omega t = 7\frac{\pi}{6} \text{ to } 11\frac{\pi}{6},$$

we obtain:

$$U_{S1(t)}(t)/U_0 = (1+\sin(\omega t)) - \left(1 + \sin\left(\omega t + \frac{0\pi}{3}\right)\right)$$

-continued $$= \sin(\omega t) - \sin\left(\omega t + \frac{0\pi}{3}\right)$$

$$= 0$$

In other words, in interval III, $U_{S1}=0$. The result is shown in FIG. 13, where $U_{S1}(t)$ has again been highlighted by larger line thickness. The waveforms for $U_{S2}(t)$ und $U_{S3}(t)$ can be obtained in a similar manner, likewise shown in FIG. 13, and are simply phase-shifted copies thereof. Accordingly, by comparison of FIGS. 13 and 10, it can be seen that the amplitude of the star voltages $U_{Sj}$ can be reduced from $2U_0$ to $U_0 \sqrt{3}$, or in other words to 86.6% of the voltage amplitude that is necessary when using a constant of said $U_0$ only. This means that a lower number of modules 10 is necessary to obtain the same phase-to-phase voltages. In addition, the average star voltage $U_{Sj}$ that is to be generated by the MESDCS 22 per cycle is lowered. For the same MESDCS 22 design, this means that there are more often possibilities to connect modules in parallel, which means that losses, and in particular battery losses can be reduced.

The corresponding MESDCS power values $\text{Power}_j(t)$ using the optimized common offset $U_{off}(t)$ as shown in FIG. 16. Comparing this with the power diagrams of FIG. 12, it is seen that the negative portions of the power is reduced, which is indicative of reduced battery losses.

A closer inspection reveals that reducing the peak voltage as compared to the constant offset case by 13.4% actually leads to a power saving of close to ⅓ as compared to the constant offset case, as will be explained next. It is assumed that the loads are purely ohmic and that the losses in the semiconductor switches are negligible as compared to the battery losses, and it is further assumed that the batteries themselves can be regarded as having ohmic resistance. Moreover, as was mentioned before, the battery losses can be reduced if batteries are connected in parallel. The smaller the star voltage $U_{Sj}$ needed at any point in time, the more modules 10 can be connected in parallel. Rather than basing the analysis on any finite number of modules, one can to a good approximation assume that the internal resistance of the converter arm is inversely proportional to the square of the voltage applied across the converter arm. Numerical simulations carried out by the inventors show that by using the optimized common offset voltage $U_{off}(t)$, as compared to the constant offset $U_0$, but leaving everything else the same, the battery losses can be reduced to 77.3%, simply due to the fact that modules can be connected in parallel more often.

However, when adapting the design of the MESDCS to the reduced star voltage amplitude, the losses can be reduced even further. Since the peak star voltages are reduced, the number of modules may likewise be reduced by the same factor $\sqrt{3}/2$. However, since the total capacity should be kept constant, the capacity of the individual module battery would be increased by the factor $2/\sqrt{3}$, and the internal resistance of the converter arm and the battery losses is reduced by the same factor. It follows that by using the optimized star voltages $U_{Sj}$ with a time dependent common offset $U_{off}(t)$ as described above, the losses can be reduced by a factor $$F = 0{,}773 \cdot \frac{\sqrt{3}}{2} = 0{,}6694$$

to 66.9% of the losses that would be obtained when using a constant offset $U_0$.

Figure 14:
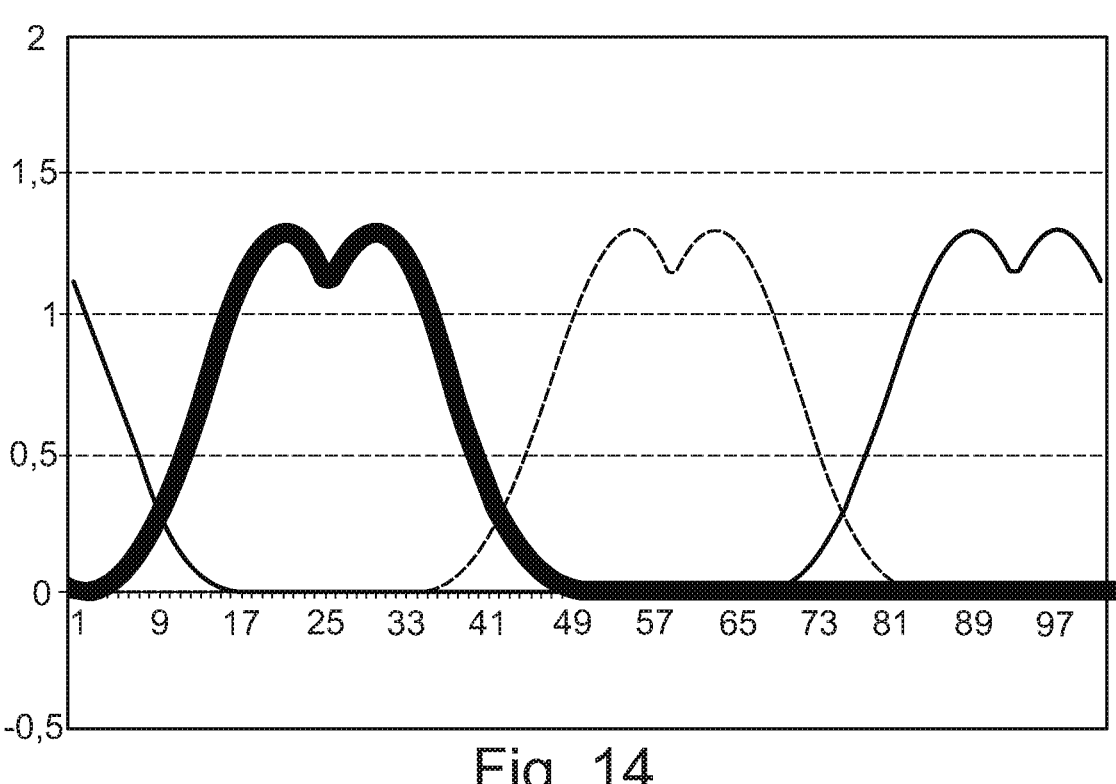
FIG. 14 shows the power losses associated with the optimized star voltages of FIG. 13.
Figure 15:
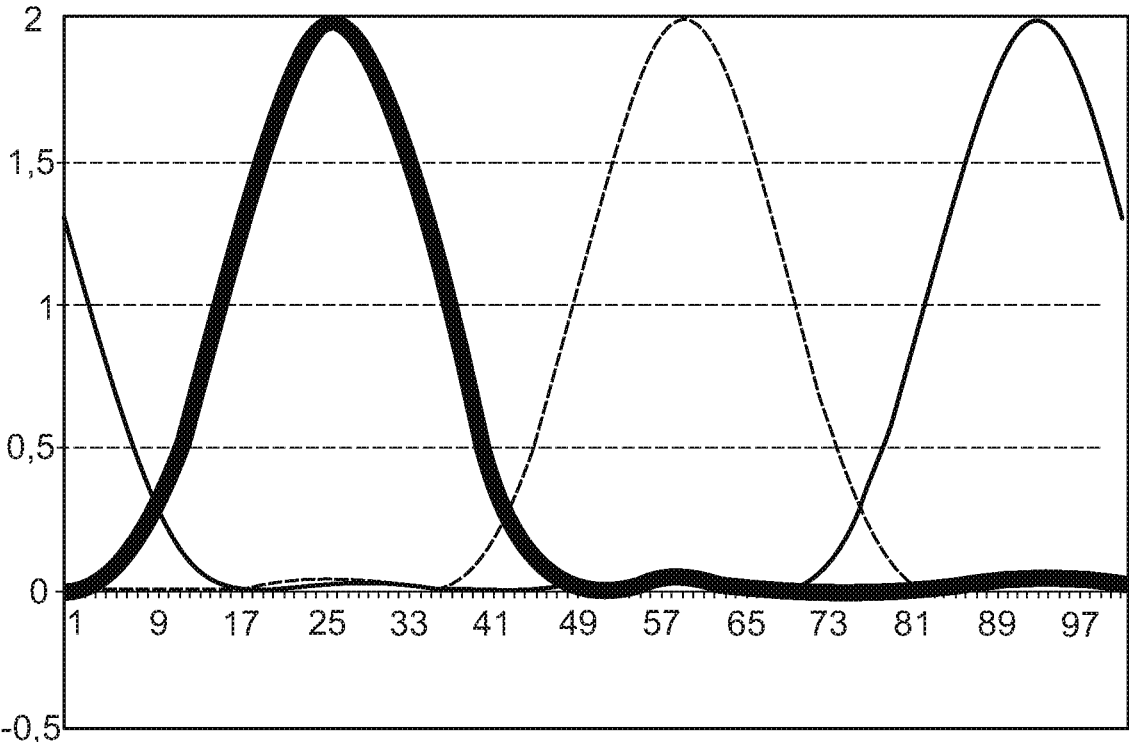
FIG. 15 shows the power loss associated with the star voltages of FIG. 10 when a constant offset is used.

FIG. 14 shows the power loss using the optimized common offset $U_{off}(t)$, while FIG. 15 shows the losses when using the constant offset $U_0$. As was mentioned above, FIG. 16 shows the power values $Power_j(t)$ of each MESDCS in operation using the optimized common offset $U_{off}(t)$. In comparing this to the power values of FIG. 12, it is seen that in this case, the size of the regions with negative power are significantly reduced for the optimized common offset $U_{off}$ (t).

Obviously, best results can be obtained if indeed, the time dependent common offset $U_{off}(t)$ is chosen such that at each instance in time, one of said star voltages $U_{Sj}$ is equal to o. However, improvements can also be obtained if this criterion is relaxed. In preferred embodiments, however, $U_{off}(t)$ is chosen such that at each instance in time, one of said star voltages differs from 0 by less than 15%, preferably less than 10% and most preferably less than 5% of the maximum absolute voltage value it requires during each period T.

So far, only a system 22 has been described in which each MESDCS 22 can generate unipolar star voltages $U_{Sj}$ only. This situation is again summarized schematically in FIG. 17, where the unipolar voltages are symbolized by arrows which are all pointing upward.

However, the considerations presented above can also be used in applications where the MESDCS 22, according to a second aspect of the present invention, are capable of generating bipolar star voltages $U_{Sj}$.

Figure 4:
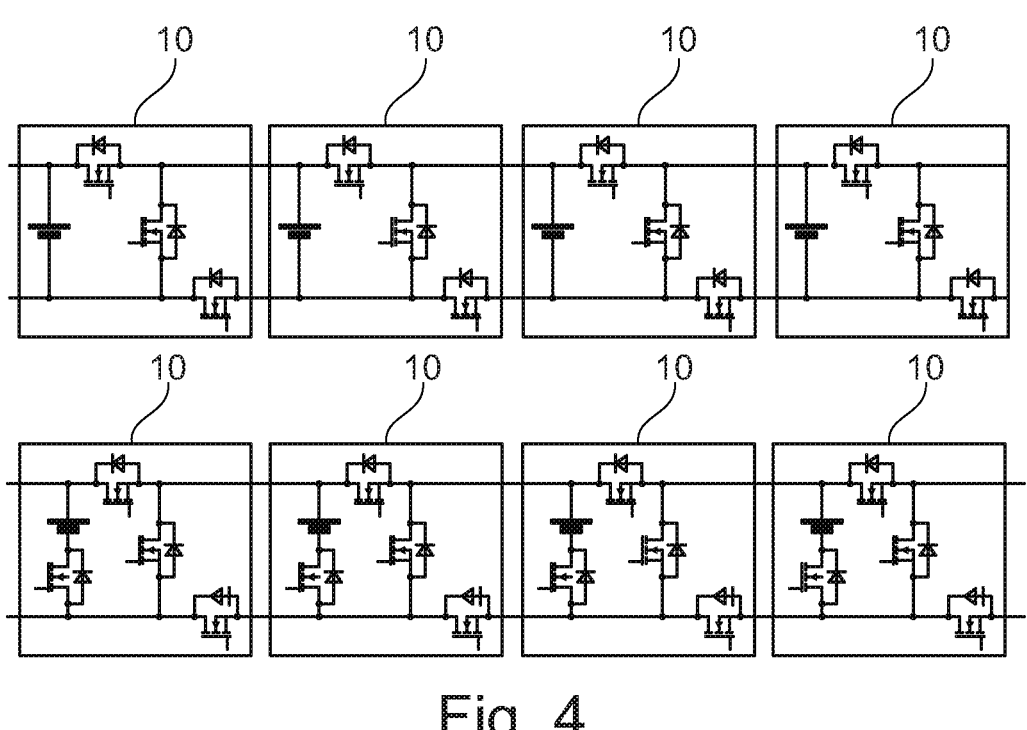
FIG. 4 shows four cascaded two-quadrant modules having three switches (top) and four switches (bottom), respectively.

One such system is schematically shown in FIG. 18, where each MESDCS 22 is comprised of two parts, 22a and 22b, which can each only generate a unipolar star voltage contribution, but with opposite polarities: The upper part 22a in FIG. 18 can only generate positive star voltages while the lower part 22b can only generate negative star voltages. Accordingly, if a negative star voltage is required, all modules of the upper part 22a would be in bypass mode, and if a positive star voltage is required, all modules of the lower part 22b would be in bypass mode. The individual parts 22a and 22b of the MESDCS 22 could then still be made up of two-quadrant modules, similar to those shown in FIGS. 3 and 4.

Moreover, FIG. 19 shows a case where each MESDCS 22 is capable of generating bipolar star voltages $U_{Sj}$, as is symbolically indicated by the arrows showing in both directions. Such MESDCS could be based on four-quadrant modules, such as the ones shown in FIGS. 1 and 2, or by two-quadrant-modules, which are provided with an additional polarity reversing circuit as discussed in the introductory part of the specification.

According to this second aspect, in one embodiment it is assumed that the star voltages $U_{Sj}$ are phase-shifted periodic functions, for example phase-shifted sinus functions, but provided with a time-dependent common offset $U_{off}(t)$ which allows for reducing the overall amplitude of the star voltages while resulting in the same phase-to-phase voltages $U_{Vj}$ that would be obtained without such time-dependent common offset $U_{off}(t)$. An example for this is shown in FIG. 20, where the star voltages are given as:

$$U_{S1}(t)=U_0 \cdot \sin(\omega t)-(U_{MAX}-U_{MIN})/2$$
$$U_{S2}(t)=U_0 \cdot \sin(\omega t+2\pi/3)-(U_{MAX}-U_{MIN})/2$$
$$U_{S3}(t)=U_0 \cdot \sin(\omega t+47\pi/3)-(U_{MAX}-U_{MIN})/2$$

Herein, $U_{MAX}$ is at every point in time the maximum of the three phase shifted sinus functions, and $U_{MIN}$ is the absolute value of the minimum of the three phase shifted sinus functions.

Accordingly, with the more general terminology introduced in the introductory portion of the specification, one can define a common offset $U_{off}(t)=-(Max (P_j(t))+Min (P_j(t)))/2$, where $Max(P_j(t))$ is defined as the maximum value among each of the functions $P_j(t)$ at a given time instance t, and Min $(P_j(t))$ is defined as the minimum value among each of the functions $P_j(t)$ at a given time instance t.

It is seen that in the case of three phases and sinus waveforms, the maximum voltage to be provided by each MESDCS is reduced by a factor of $\frac{1}{2} \cdot \sqrt{3}=0.866$, as compared to the case without the time-dependent offset $U_{off}(t)$. This means that again, the MESDCS can be used with a smaller number of modules, or can be operated with reduced module voltages.

Moreover, without changing the design of the MESDCS, modules can be connected in parallel more often, such that only by this measure, the battery losses can be reduced by 11%. It is further emphasized that this second aspect of the invention can be very easily applied by only modifying the control provided by the control system 30.

Clearly, there are many possibilities to generate time-dependent offset function $U_{off}(t)$ that allow for reducing the voltage amplitudes of the MESDCS to be less than twice the amplitude of the sinus function.

A further suitable definition of $U_{off}(t)$ for this purpose was present in the summary of the invention as follows:

$U_{off}(t)=L-Max (P_j(t))$, if Max $(P_j(t))>L$, and
$U_{off}(t)=-L-Min (P_j(t))$, if Min $(P_j(t))<-L$, wherein $Max(P_j(t))$ is defined as the maximum value among each of the functions $P_j(t)$ at a given time instance t, and Min $(P_j(t))$ is defined as the minimum value among each of the functions $P_j(t)$ at a given time instance t, and L is a constant. In the important case N=3 and $P_j(t)=A \cdot \sin (\omega t+(j-1) \cdot 2\pi/N)$, $L=A \cdot \sqrt{3}/2$.

It is however emphasized that due to the fact that using the MESDCS 22, practically any star voltage waveforms can be generated, it is easily possible to provide other offset functions, different from the ones described herein, which can readily be implemented without any modifications to the hardware, but only by revising the control of the control unit 30 accordingly.

In FIG. 21, a module 10 similar to that of FIG. 3 is shown in detail. As shown therein, the energy storage element 16 is formed by a battery having in this case a nominal voltage of 3.7 V only. The battery 16 has a first pole 16a connected with one of the first terminals 12, referenced as "A" in FIG. 21, and a second pole 16b connected with the other one of the first terminals 12 ("B"). The module comprises a first switch S1 having a first switch terminal connected with one of the second terminals 14 ("D") of the module 10 and a second switch terminal 36 connected with the first pole 16a of said battery 16, a second switch S2 having a first switch terminal 34 connected with the other one of the second terminals 14 ("C") of the module 10 and a second switch terminal 36 connected with the second pole 16b of said battery 16, and a third switch S3 provided in a connection line 38 connecting the first switch terminal 34 of the first switch S1 and the second switch terminal 36 of the second switch S2.

Herein, the term "switch terminal" was introduced merely to define "points" to either side of the switch such as to better describe the structure of the module. The two terminals of the switch define points which are conductively connected when the switch is closed. However, the term "switch terminal" does not imply any specific physical entity or structural element.

The module 10 allows for connecting its battery 16 in series with the battery 16 of an adjacent module 10 connected to its second terminals 14 by opening the first and second switches S1, S2 and closing the third switch S3, and for connecting its battery 16 in parallel with the battery 16 of an adjacent module 10 connected to its second terminals 14 by closing the first and second switches S1, S2 and opening the third switch S3.

Different from what is shown in FIG. 21, the module 10 may further comprise a fourth switch connected either between the first pole 16a of said battery 16 and the second switch terminal 36 of the first switch S1, or between the second pole 16b of said battery 16 and the second switch terminal 36 of the second switch S2. Such forth switch allows for deactivating or bypassing the battery 16 of a given module 10 in a series or parallel connection of batteries 16 of adjacent modules 10 connected to the first terminals 12 and second terminals 14 of said given module 10, respectively.

Importantly, in the embodiment shown, the gate voltages of the switches S1, S2 and S3 are, at least in part, taken directly from the batteries 16, which in the embodiment shown have an unusually low voltage. In prior art MESDCS 22, the gate voltages for the switches would be provided via an external voltage source, but not from the batteries included in the modules.

One reason why the skilled person would not have considered such a design is that in prior art, one would usually use modules 10 having batteries 16 with considerably higher voltages, for example having a nominal voltage of 50 V, such as to keep the total number of modules necessary for obtaining a desired total output voltage low. However, this means that in prior art modules, DC-DC converters would have to be used for down-converting the battery voltage to a suitable gate voltage for the semiconductor switch, such as a MOSFET switching device. Such DC-DC converters would add significantly to the costs of the module. A module having three switches 18 would require two DC-DC converters per module, and the eight-switch-module shown in FIG. 1 would even require five DC-DC converters.

In contrast to this, when the battery voltages are in the same range as the required gate voltages, one can almost completely dispense with DC-DC converters. In this case, the gate voltages can be supplied either directly from the battery, or via a voltage doubling device 40, which however is significantly cheaper than a DC-DC converter. The three-switch module shown in FIG. 21 requires only a single voltage doubling device 40, while the eight-switch-module of FIG. 1 would require for voltage doubling devices 40.

When using the module batteries 16 to supply the gate voltages, an obvious design would be to provide all of the switches 18; S1, S2 and S3 within a given module 10 by the same module's battery 16. However, in the embodiment shown in FIG. 21, it is seen that the switches S1 and S2 are actually powered by the battery 16 of a different module 10, in this case the neighboring module 10 to the right. This leads to a fail-proof converter design, in which the converter arm as a whole remains functional even if one of the batteries 16, and all of the switches powered thereby fail completely, as is apparent from FIG. 22. FIG. 22 shows two full and part of a third module 10 of the type shown in FIG. 21, where it is assumed that the battery 16 in the module 10 in the middle breaks completely. This means that switch S3 of this middle module 10, but also the switches S1 and S2 of the module 10 to the left are nonconducting, as is indicated by the crosses. However, since the switch S3 of the leftmost module remains active, and since the S1 in the middle module is powered by the battery 16 of the rightmost module, the module 10 in the middle can be effectively bypassed by the conductive path shown therein with the thick line.

LIST OF REFERENCE SIGNS 10 module
12 first terminal
14 second terminal
16 energy storage device
18 switch
20 system for providing N bipolar AC phase voltages
22 MESDCS
24 first end of MESDCS
26 second end of MESDCS
28 floating connection point
30 control system
32 system for providing N bipolar AC phase voltages
34 first switch terminal
36 second switch terminal
38 connection line
40 voltage doubling device

The invention claimed is:

1. A system for providing N bipolar AC phase voltages $U_{Vj}$, with j=1 ... N, wherein N is an integer number that is two or more, said system comprising:

N modular energy storage direct converter systems (MESDCS) and a control system, wherein each MESDCS comprises a converter arm having a first end and a second end and comprising a plurality of sequentially interconnected modules, wherein each module comprises at least one first terminal and at least one second terminal, a storage element for electrical energy or an energy conversion element, and a plurality of module switches, wherein in each two adjacent modules, the at least one first terminal of one module is connected either directly or via an intermediate component to the at least one second terminal of the other module, wherein under control of said control system, said plurality of module switches are configured to connect energy storage elements or energy conversion elements of adjacent modules in series, and selectively deactivate and/or bypass the energy storage element or energy conversion element of each module and connect energy storage elements or energy conversion elements of adjacent modules in parallel, wherein the first ends of each MESDCS are connected to a common floating connection point, and wherein the j-th MESDCS is controllable, by said control system, to output at its second end a star voltage $U_{Sj}$ with respect to the floating connection point, with j=1, . . . , N, wherein said system is configured to provide each of said bipolar AC phase voltages $U_{Vj}$ as voltage differences between two of said star voltages, such that $U_{Vj}=U_{Sj+1}-U_{Sj}$, or $U_{Vj}=U_{Sj}-U_{Sj+1}$ for each j between 1 and N−1, and $U_{VN}=U_{S1}-U_{SN}$, or $U_{VN}=U_{SN}-U_{S1}$, respectively, wherein said control system is configured to control each MESDCS to output a corresponding unipolar star voltage $U_{Sj}$ that can be decomposed into a periodic bipolar AC function $P_j(t)$ and a unipolar offset $U_{off}(t)$ that is common to each star voltage $U_{Sj}$, such that $U_{Sj}(t)=P_j(t)+U_{off}(t)$, wherein the absolute value of said common unipolar offset $U_{off}(t)$ is at all times t sufficiently high that $U_{Sj}(t)$ is unipolar, wherein the periodic bipolar AC functions $P_j(t)$ associated with different star voltages $U_{Sj}$ are phase-shifted copies of each other such that for each integers i, j chosen from [1, . . . , N] and k chosen from [1, . . . , N−1], $P_i(t)=P_j(t+k \cdot T/N)$, wherein T is the period of said periodic bipolar AC function $P_j(t)$.

2. The system of claim 1, wherein $U_{off}(t)$ is a constant offset U0, wherein U0 is chosen such that each star voltage $U_{Sj}$ is equal to zero once per period T, or that an absolute value of each star voltage differs from zero once per period T by less than 15% of the maximum absolute voltage value which that star voltage acquires during each period T.

3. The system of claim 1, wherein $U_{off}(t)$ is a time-dependent offset chosen such that at each instance in time, one of said star voltages $U_{Sj}$ is equal to zero, or that an absolute value of each star voltage differs from zero by less than 15% of the maximum absolute voltage value which that star voltage acquires during each period T.

4. The system of claim 2, wherein $P_j(t)=U0 \cdot \sin(\omega t+(j-1) \cdot 2\pi/N)$, with U0 being a voltage amplitude and $\omega=2\pi/T$.

5. The system of claim 1, wherein each module has two first terminals and two second terminals, wherein each energy storage element or energy conversion element has a first pole connected or connectable with one of the first terminals and a second pole connected or connectable with the other one of the first terminals, and wherein said plurality of module switches comprise a first switch having a first switch terminal connected with one of the second terminals of the module and a second switch terminal connected or connectable with the first pole of said energy storage/energy conversion element, a second switch having a first switch terminal connected with the other one of the second terminals of the module and a second switch terminal connected or connectable with the second pole of said energy storage/energy conversion element, and a third switch provided in a connection line connecting the first switch terminal of the first switch and the second switch terminal of the second switch, said module configured to connect its energy storage/energy conversion element in series with the energy storage/energy conversion element of an adjacent module connected to its second terminals by opening the first and second switches and closing the third switch, and configured to connect its energy storage/energy conversion element in parallel with the storage/energy conversion element of an adjacent module connected to its second terminals by closing the first and second switches and opening the third switch.

6. The system of claim 5, wherein each module further comprises a fourth switch connected either between the first pole of said storage/energy conversion element and the second switch terminal of the first switch, or between the second pole of said storage/energy conversion element and the second switch terminal of the second switch, said fourth switch configured to deactivate or bypass the storage/energy conversion element of a given module in a series or parallel connection of storage/energy conversion elements of adjacent modules connected to the first terminals and second terminals of said given module, respectively.

7. The system of claim 1, wherein the energy storage elements of the modules are batteries having a nominal voltage, wherein the nominal battery voltages are equal to or less than 25 V and wherein the batteries within a module do not comprise a battery management system of their own.

8. The system of claim 1, wherein said module switches are semiconductor switches having a gate, and wherein a gate voltage of at least one semiconductor switch of each module is provided by a battery of said module forming said energy storage element.

9. The system of claim 1, wherein said module switches are semiconductor switches having a gate, and wherein a gate voltage of at least one semiconductor switch of each module is provided by a battery of another one of the modules, said battery forming said energy storage of said another module.

10. The system of claim 8, wherein in a given module, a first group of switches among said module switches have their gate voltages provided by the battery of said given module, and a second group of switches among said module switches have their gate voltages provided by the battery of one or more different modules wherein each of the first and second groups comprises one or more switches and wherein said first and second groups are chosen such that in case the battery in the given module fails and any switch of said first group is no longer operative, the battery of said given module can be bypassed in one or both of a series connection or a parallel connection of modules to both sides of said given module.

11. The system of claim 10, wherein said first group of switches comprises the third switch and said second group of switches comprises the first and second switches.

12. The system of claim 1, wherein $P_i(t)=P_j(t+(i-j) \cdot T/N)$.

13. A system for providing N bipolar AC phase voltages $U_{Vj}$, with j=1 . . . N, wherein N is an integer number that is two or more, said system comprising:

N modular energy storage direct converter systems (MESDCS) and a control system, wherein each MESDCS comprises a converter arm having a first end and a second end and comprising a plurality of sequentially interconnected modules, wherein each module comprises at least one first terminal and at least one second terminal, a storage element for electrical energy or an energy conversion element, and a plurality of module switches, wherein in each two adjacent modules the at least one first terminal of one module is connected either directly or via an intermediate component to the at least one second terminal of the other module, wherein under control of said control system, said plurality of module switches are configured to connect energy storage elements or energy conversion elements of adjacent modules in series, and for one or both of selectively deactivate or bypass the energy storage element or energy conversion element of each module and connect energy storage elements or energy conversion elements of adjacent modules in parallel, wherein the first ends of each MESDCS are connected to a common floating connection point, and wherein the j-th MESDCS is controllable, by said control system, to output a star voltage $U_{Sj}$ with respect to the floating connection point, with j=1, . . . , N, wherein said system is configured to provide each of said bipolar AC phase voltages $U_{Vj}$ as voltage differences between two of said star voltages, such that $U_{Vj}=U_{Sj+1}-U_{Sj}$, or $U_{Vj}=U_{Sj}-U_{Sj+1}$ for each j between 1 and N−1, and $U_{VN}=U_{S1}-U_{SN}$, or $U_{VN}=U_{SN}-U_{S1}$, respectively, wherein said control system is configured to control each MESDCS to output a corresponding bipolar star voltage $U_{Sj}$ that can be decomposed into a periodic bipolar AC function $P_j(t)$ and a bipolar offset $U_{off}(t)$ that is common to each star voltage $U_{Sj}$, such that $U_{Sj}=P_j(t)+U_{off}(t)$, wherein the periodic bipolar AC functions $P_j(t)$ associated with different star voltages $U_{Sj}$ are phase-shifted copies of each other such that for each integers i, j chosen from [1, . . . , N] and k chosen from [1, . . . , N−1], $P_i(t)=P_j(t+k\cdot T/N)$, wherein T is a period of said periodic bipolar AC function $P_j(t)$, and wherein preferably, $P_i(t)=P_j(t+(i-j)\cdot T/N)$, and wherein $U_{off}(t)$ is such that for each star voltage $U_{Sj}$, a difference between the maximum and minimum values acquired during a full period T is less than without such bipolar offset.

14. The system of claim 13, wherein $P_j(t)=A\cdot\sin(\omega t+j-1)\cdot 2\pi/N)$, with A being a voltage amplitude and $\omega$ an angular frequency, and wherein $U_{off}(t)$ is such that for each bipolar AC phase voltage $U_{Sj}$, the difference between the maximum and minimum values acquired during a full period $2\pi/\omega$ is less than $2\cdot A$.

15. The system of claim 13, wherein
$U_{off}(t)=-(Max(P_j(t))+Min(P_j(t)))/2$,
where $Max(P_j(t))$ is defined as the maximum value among each of the functions $P_j(t)$ at a given time instance t, and $Min(P_j(t))$ is defined as the minimum value among each of the functions $P_j(t)$ at a given time instance t.

16. The system of claim 13, wherein
$U_{off}(t)=L-Max(P_j(t))$, if $Max(P_j(t))>L$, and
$U_{off}(t)=-L-Min(P_j(t))$, if $Min(P_j(t))<-L$,
wherein $Max(P_j(t))$ is defined as the maximum value among each of the functions $P_j(t)$ at a given time instance t, and $Min(P_j(t))$ is defined as the minimum value among each of the functions $P_j(t)$ at a given time instance t, and L is a constant.

17. The system of claim 16, wherein $P_j(t)=A\cdot\sin(\omega t+(j-1)\cdot 2\pi/N)$, $N=3$ and $L=A\cdot\sqrt{3}/2$.

18. The system of claim 13, wherein said plurality of module switches are configured to connect energy storage elements or energy conversion elements of adjacent modules in anti-series, wherein the anti-series connection of an energy or energy conversion element corresponds to a series connection with reversed polarity.

19. The system of claim 13, wherein said system is connected to a load comprising N impedances Zj, j=1, 2, . . . N, connected in a ring configuration, wherein the k-th impedance Zk is connected between the second ends of the k-th and (k+1)-th MESDCS, such that the k-th bipolar AC phase voltage $U_{Vk}$ is applied across the k-th impedance Zk, with k=1, . . . , N−1, and the N-th impedance ZN is connected between the second ends of the N-th and the first MESDCS, and wherein the load is an electric motor.

20. A method for providing N bipolar AC phase voltages $U_{Vj}$, with j=1 . . . N using N modular energy storage direct converter systems (MESDCS), wherein N is an integer number that is two or more, wherein each MESDCS comprises a converter arm having a first end and a second end and comprising a plurality of sequentially interconnected modules, wherein each module comprises at least one first terminal and at least one second terminal, a storage element for electrical energy or an energy conversion element, and a plurality of module switches, wherein in each two adjacent modules, the at least one first terminal of one module is connected either directly or via an intermediate component to the at least one second terminal of the other module, wherein said method comprises operating said plurality of module switches for connecting energy storage elements or energy conversion elements of adjacent modules in series, and for one or both of selectively deactivating or bypassing the energy storage element or energy conversion element of each module and connecting energy storage elements or energy conversion elements of adjacent modules in parallel, wherein the first ends of each MESDCS are connected to a common floating connection point, and wherein the j-th MESDCS is controlled to output at its second end a star voltage $U_{Sj}$ with respect to the floating connection point, with j=1, . . . , N, wherein the method comprises providing each of said bipolar AC phase voltages $U_{Vj}$ as voltage differences between two of said star voltages, such that $U_{Vj}=U_{Sj+1}-U_{Sj}$, or $U_{Vj}=U_{Sj}-U_{Sj+1}$ for each j between 1 and N−1, and $U_{VN}=U_{S1}-U_{SN}$, or $U_{VN}=U_{SN}-U_{S1}$, respectively, wherein each MESDCS is controlled to output a corresponding unipolar star voltage $U_{Sj}$ that can be decomposed into a periodic bipolar AC function $P_j(t)$ and a unipolar offset $U_{off}(t)$ that is common to each star voltage $U_{Sj}$, such that $U_{Sj}(t)=P_j(t)+U_{off}(t)$, wherein the absolute value of said common unipolar offset $U_{off}(t)$ is at all times t sufficiently high that $U_{Sj}(t)$ is unipolar, wherein the periodic bipolar AC functions $P_j(t)$ associated with different star voltages $U_{Sj}$ are phase-shifted copies of each other such that for each integers i, j chosen from [1, . . . , N] and k chosen from [1, . . . , N−1], $P_i(t)=P_j(t+k\cdot T/N)$, wherein T is the period of said periodic bipolar AC function $P_j(t)$, wherein $P_i(t)=P_j(t+(i-j)\cdot T/N)$.

* * * * *